United States Patent
Halder et al.

(10) Patent No.: US 12,014,424 B2
(45) Date of Patent: Jun. 18, 2024

(54) AUTONOMOUS VEHICLE PREMIUM COMPUTATION USING PREDICTIVE MODELS

(71) Applicant: SafeAI, Inc., Milpitas, CA (US)

(72) Inventors: Bibhrajit Halder, Sunnyvale, CA (US); Sudipta Mazumdar, Markham (CA)

(73) Assignee: SafeAI, Inc., Santa Clara, CA (US)

( * ) Notice: Subject to any disclaimer, the term of this patent is extended or adjusted under 35 U.S.C. 154(b) by 567 days.

(21) Appl. No.: 16/597,787

(22) Filed: Oct. 9, 2019

(65) Prior Publication Data

US 2020/0111169 A1 Apr. 9, 2020

Related U.S. Application Data

(60) Provisional application No. 62/743,520, filed on Oct. 9, 2018.

(51) Int. Cl.
| | |
|---|---|
| *G06Q 40/00* | (2023.01) |
| *G01C 21/34* | (2006.01) |
| *G01C 21/36* | (2006.01) |
| *G06Q 40/08* | (2012.01) |
| *G05D 1/00* | (2006.01) |

(52) U.S. Cl.
CPC ......... *G06Q 40/08* (2013.01); *G01C 21/3453* (2013.01); *G01C 21/3691* (2013.01); *G05D 1/0088* (2013.01)

(58) Field of Classification Search
None
See application file for complete search history.

(56) References Cited

U.S. PATENT DOCUMENTS

| | | | |
|---|---|---|---|
| 9,646,347 B1 | 5/2017 | Hayward et al. | |
| 9,715,711 B1 | 7/2017 | Konrardy et al. | |
| 9,927,252 B1* | 3/2018 | Chokshi | G01C 21/3461 |
| 2015/0170287 A1* | 6/2015 | Tirone | G06Q 40/08 |
| | | | 705/4 |
| 2016/0167652 A1* | 6/2016 | Slusar | G01C 21/3461 |
| | | | 701/27 |
| 2019/0049948 A1* | 2/2019 | Patel | G05D 1/0027 |
| 2019/0325525 A1* | 10/2019 | Kline | G01C 21/3407 |
| 2020/0090426 A1* | 3/2020 | Barnes | G06N 5/01 |

* cited by examiner

*Primary Examiner* — Chia-Yi Liu
(74) *Attorney, Agent, or Firm* — Kilpatrick Townsend & Stockton LLP

(57) ABSTRACT

The present disclosure relates generally to systems for facilitating the use of autonomous vehicles (AVs), and more particularly to automated artificial intelligence (AI)-based techniques for determining an insurance premium for an AV ride based upon various factors including the evaluation of risk associated with the AV ride. An automated AI-based infrastructure is provided that uses automated machine-learning (ML) based techniques for evaluating a level of risk for any particular AV ride and then determining an insurance premium for the AV ride based on the level of risk. The insurance premium determination incorporates Usage Based Insurance Pricing (UBIP) that has been customized for autonomous driving, whereby the level of risk is predicted based on information associated with the expected usage of the AV during the ride. Thus, the insurance premium is customized for each ride and can be determined as part of calculating upfront the total price of the ride.

20 Claims, 8 Drawing Sheets

AUTONOMOUS VEHICLE PREMIUM COMPUTATION USING PREDICTIVE MODELS

CROSS-REFERENCES TO RELATED APPLICATIONS

This application claims the benefit of and priority to U.S. Provisional Application No. 62/743,520 filed Oct. 9, 2018, entitled "USAGE BASED INSURANCE PRICING FOR AUTONOMOUS VEHICLES." The contents of U.S. Provisional Application No. 62/743,520 are incorporated herein in their entirety for all purposes.

TECHNICAL FIELD

The present disclosure relates generally to systems for facilitating the use of autonomous vehicles (AVs), and more particularly to automated artificial intelligence (AI)-based techniques for determining an insurance premium for an AV ride based upon various factors including the evaluation of risk associated with the AV ride.

BACKGROUND

The emergence of autonomous vehicles (AVs) is giving rise to unique problems. Automating technical solutions to these problems is a non-trivial task. For example, in the not-to-distant future, a consumer wanting a ride from point A to point B will place an order for the ride with an AV ride provider who will dispatch an AV for the consumer. The AV will pick up the consumer from point A and autonomously drive the consumer to point B, where the consumer will be dropped off.

The autonomous nature of the ride raises unique problems that are specific to the autonomous driving domain. For example, currently, insurance pricing for a vehicle is determined primarily based on attributes associated with the driver of the vehicle and attributes associated with the vehicle. For example, to determine the insurance premium for a car being rented, a car rental agency typically takes into consideration the make and model of the car, the driver's age, the driver's driving history, and the like. Since in the near future, AV technology will have reached a point where a user booking a ride does not need to perform any driving tasks, but may instead simply request to be driven from one location to another with the AV acting as a chauffeur, determining an insurance premium for such an AV ride is challenging and cannot be determined solely based on conventional factors such as the driver attributes mentioned above.

BRIEF SUMMARY

The present disclosure relates generally to systems for facilitating the use of autonomous vehicles (AVs), and more particularly to automated artificial intelligence (AI)-based techniques for determining an insurance premium for an AV ride based upon various factors including the evaluation of risk associated with the AV ride. Various embodiments are described herein, including methods, systems, non-transitory computer-readable storage media storing programs, code, or instructions executable by one or more processors, and the like.

In certain embodiments, an automated AI-based infrastructure is provided that uses automated machine-learning (ML) based techniques for evaluating a level of risk for any particular AV ride and then determining an insurance premium for the AV ride based on the level of risk. The insurance premium determination incorporates Usage Based Insurance Pricing (UBIP) that has been customized for autonomous driving, whereby the level of risk is predicted based on information associated with the expected usage of the AV during the ride. Thus, the insurance premium is customized for each ride and can be determined as part of calculating upfront the total price of the ride.

The automated AI-based infrastructure uses various pieces of data related to the ride for automatically computing the insurance premium for the ride. Based upon the nature of the data, the data used can be organized into various categories or classes of data. Examples of such categories or classes of data include, without limitation, data related to the route, data related to the vehicle, data related to weather and road conditions for the ride, and the like. In certain embodiments, for each data category, a risk value or factor is computed based upon the data for the category. In addition to the risk value, a loss value is computed based upon the data for the category. The data used to compute the loss value for a particular category can include data used to compute the risk value for the particular category, but the data used for computing the risk value and the loss value need not be identical. The overall or final insurance premium for the ride is then calculated based upon the risks values and loss values computed for the individual categories. In certain embodiments, the final insurance premium is computed using premium values for each category, where the premium value for a particular category is computed based on the risk value and the loss value for that particular category.

In certain embodiments, the risk value or loss value for each category may be computed based upon data determined and/or captured at different times relative to the time of the ride. For instance, in certain embodiments, the data used for each category can be classified as belonging to one of the following types: a priori data, historical data, and real-time data associated with the time of the ride. For example, the data used for the AV vehicle category may include a priori data (e.g., data indicative of the software version of a software controller being used to autonomously control and drive the AV, and capabilities of that software version), historical data (e.g., past performance over a period of time (e.g., 6 months) of the AV software version being used for the ride), and real-time data (e.g., a list of in-vehicle diagnostics obtained at the time of a ride order or at the actual time of ride). In certain embodiments, for each category, an ML-based risk model is trained using these various types of data for that particular category, such that the model is configured to take as inputs the various types of data and predict a risk value. Another ML-trained pricing model is then used to predict a loss value for that particular category. The risk values and loss values computed for the individual categories are then used to compute a final insurance premium value.

In certain embodiments, a computer system is configured to perform a method that involves (1) receiving a request to compute an insurance premium for an autonomous vehicle (AV) ride being booked by a user. The request includes information identifying a start point and an end point for the AV ride, and information identifying an AV to be used for the ride. The method further involves (2) determining at least one route from the start point to the end point, the at least one route including a first route; (3) accessing route data including attributes of the first route; and (4) accessing vehicle data including attributes of the AV. At least some of the attributes included in the route data or the vehicle data are determined at a time associated with the AV ride. The method further involves (5) generating, using a first pre-trained risk model, a first risk value for the first route; and (6) generating, using a second pre-trained risk model, a second risk value for the AV. The first pre-trained risk model predicts the first risk value based on the route data. The first risk value represents a likelihood, given the route data, of occurrence of an incident during the AV ride, where an incident is an unsafe condition or disengagement of autonomous control. The second pre-trained risk model predicts the second risk value based on the vehicle data. The second risk value represents a likelihood, given the vehicle data, of occurrence of an incident during the AV ride. The method further involves (7) generating, using a first pre-trained pricing model, a first loss value for the first route; and (8) generating, using a second pre-trained pricing model, a second loss value for the AV. The first pre-trained pricing model predicts the first loss value based on the route data. The first loss value represents a loss associated with the route data. The second pre-trained pricing model predicts the second loss value based on the vehicle data. The second loss value represents a loss associated with the vehicle data. The method further involves (9) calculating a value for the insurance premium for the AV ride based on the first risk value, the first loss value, the second risk value, and the second loss value; and (10) communicating the value for the insurance premium to a source of the request.

In certain embodiments, the method above further involves (11) accessing weather and road condition data, the weather and road condition data indicating weather expected during the AV ride and road conditions along the route; (12) generating, using a third pre-trained risk model, a third risk value, wherein the third pre-trained risk model predicts the third risk value based on the weather and road condition data, and wherein the third risk value represents a likelihood, given the weather and road condition data, of occurrence of an incident during the AV ride; and (13) generating, using a third pre-trained pricing model, a third loss value, wherein the third pre-trained pricing model predicts the third loss value based on the weather and road condition data, and wherein the third loss value represents a loss associated with the weather and road condition data. In such embodiments, calculating the value for the insurance premium is further based on the third risk value and the third loss value.

In certain embodiments, the at least one route includes a second route, and the method above further involves: (11) generating, using the first pre-trained risk model, a third risk value for a second route of the at least one route, wherein the first pre-trained risk model predicts the third risk value based on attributes of the second route, and wherein the third risk value represents a likelihood, given the attributes of the second route, of occurrence of an incident during the AV ride; (12) generating, using the first pre-trained pricing model, a third loss value for second route, wherein the first pre-trained pricing model predicts the third loss value based on the attributes of the second route, and wherein the third loss value represents a loss associated with the attributes of the second route; (13) calculating a second value for the insurance premium for the AV ride based on the third risk value and the third loss value; and (14) selecting the first route or the second route for use during the AV ride, wherein selecting the first route or the second route is based on a comparison of the second value for the insurance premium and the value for the insurance premium calculated based on the first risk value. Further, in certain embodiments, selecting the first route or the second route comprises selecting whichever route is associated with a lowest value for the insurance premium.

In certain embodiments, calculating the value for the insurance premium comprises (1) calculating an expected loss for the first route based on the first risk value and the first loss value, and (2) calculating an expected loss for the AV based on the second risk value and the second loss value.

In certain embodiments, the attributes of the AV include attributes of a hardware or software configuration of the AV. For example, the attributes of the AV may include attributes relating to a configuration of one or more sensors of the AV.

In certain embodiments, at least some of the attributes determined at the time associated with the AV ride relate to a time window relative to the time associated with the AV ride. The time associated with the AV ride can be a time of booking the AV ride or a time of the AV ride. Further, in certain embodiments, at least some of the attributes included in the route data or the vehicle data include historical data relating to a period of time earlier than the time window, with the historical data being collected prior to receiving the request.

In certain embodiments, a pickup and drop-off complexity index (PDCI) is calculated based on attributes associated with the start point and attributes associated with the end point. The PDCI represents a degree of difficulty in navigating around the start location and the end location, and is used by a pre-trained risk model to predict a risk value based on the PDCI.

In certain embodiments, a route complexity index (RCI) is calculated based on attributes associated with a route. The RCI represents a degree of difficulty in navigating along the route, and is used by a pre-trained risk model to predict a risk value based on the RCI.

In certain embodiments, a pre-trained risk model is trained using simulation data generated during a computer simulation of an AV's operation.

In certain embodiments, at least one pre-trained risk model and at least one pre-trained pricing model are automatically selected based on identifying a plurality of data categories to use for computing an insurance premium, where the plurality of data categories includes a vehicle category and a route category.

The foregoing, together with other features and embodiments will become more apparent upon referring to the following specification, claims, and accompanying drawings.

BRIEF DESCRIPTION OF THE DRAWINGS

The present disclosure can be best understood by reference to the following description taken in conjunction with the accompanying figures, in which like parts may be referred to by like numerals.

DETAILED DESCRIPTION

Figure 1:
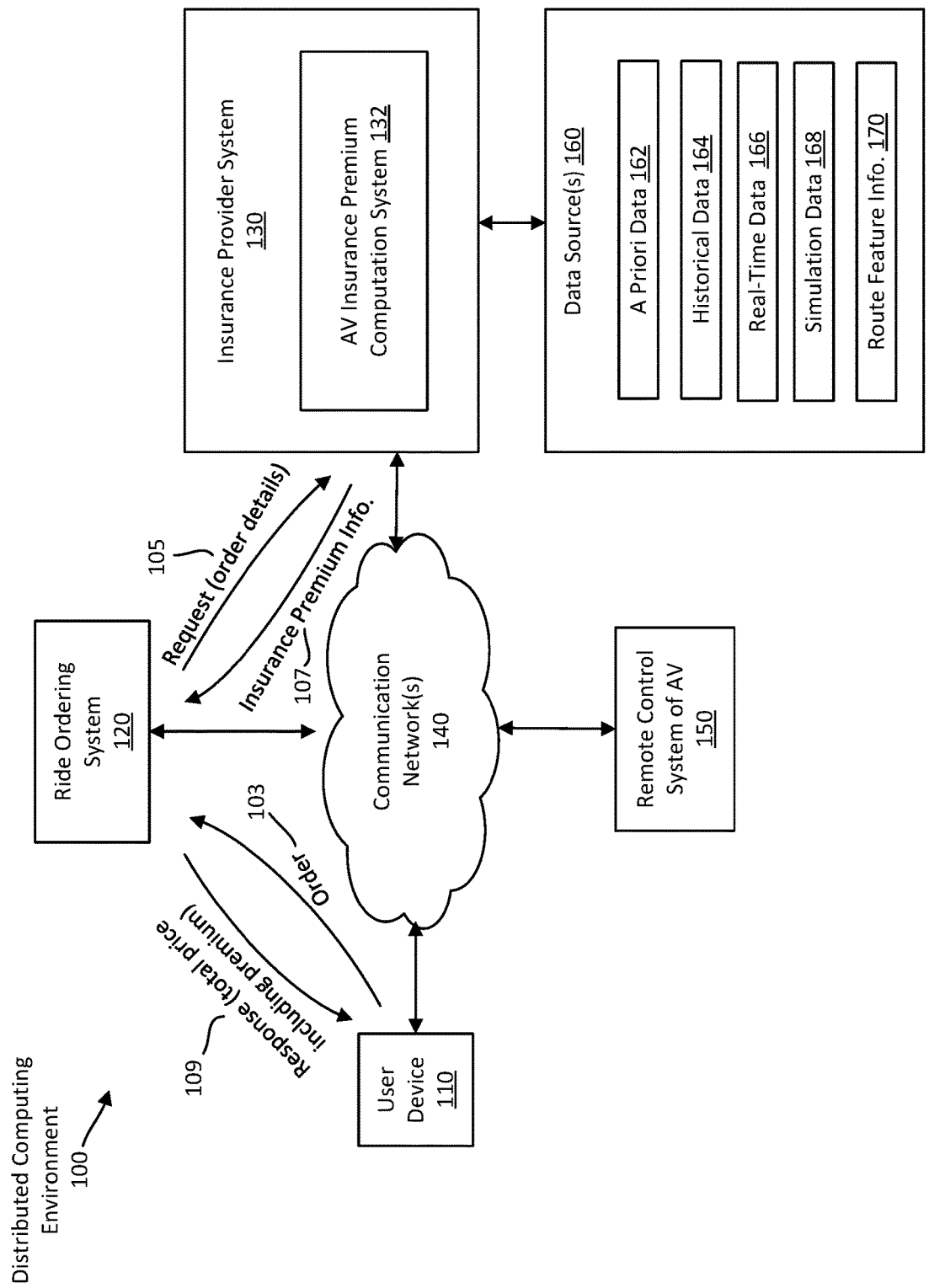
FIG. 1 illustrates an example distributed computing environment for determining an insurance premium according to certain embodiments.

Exemplary examples and embodiments of the present disclosure will now be described in detail with reference to the drawings, which are provided as illustrative examples so as to enable those skilled in the art to practice the disclosure. Notably, the figures and examples below are not meant to limit the scope of the present disclosure to a single embodiment, but other embodiments are possible by way of interchanges of or combinations of with some or all of the described or illustrated elements. Wherever convenient, the same reference numbers will be used throughout the drawings to refer to same or similar parts.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

The present disclosure relates generally to systems for facilitating the use of autonomous vehicles (AVs), and more particularly to automated artificial intelligence (AI)-based techniques for determining an insurance premium for an AV ride based upon various factors including the evaluation of risk associated with the AV ride. In certain embodiments, an automated AI-based infrastructure is provided that uses automated machine-learning (ML) based techniques for evaluating a level of risk for any particular AV ride and then determining an insurance premium for the AV ride based on the level of risk. The insurance premium determination incorporates Usage Based Insurance Pricing (UBIP) that has been customized for autonomous driving, whereby the level of risk is predicted based on information associated with the expected usage of the AV during the ride. Thus, the insurance premium is customized for each ride and can be determined as part of calculating upfront the total price of the ride.

In certain embodiments, an automated AI-based infrastructure is configured to determine a risk value and a loss value and, based on the risk value and the loss value, determine a final value for an insurance premium of an AV ride. The risk value is determined using a risk model, indicates the likelihood of an incident occurring during the AV ride, and can be represented as a probability of an incident (PI) occurring given a set of data related to the AV ride. The loss value is a monetary value determined using a pricing model and represents a liability cost associated with an incident (liability given incident or LGI) and can also be determined based on a set of data related to the AV ride. Thus, the loss value is a loss associated with the set of data related to the AV ride. The data used to determine the loss value may include some or all of the data used to determine the risk value, but is not necessarily the same. The risk value and loss value can be used to compute an expected loss (EL), for example, as the product of PI*LGI. The final premium value can then be determined taking into consideration the expected loss. In certain embodiments, the final insurance premium is computed using expected losses or premium values for each category, where the expected loss or premium value for a particular category is computed based on the risk value and the loss value for that particular category.

As used herein, the term "autonomous vehicle" or AV refers to a vehicle configured to perform one or more operations autonomously and substantially free of any human user or manual input. For example, in certain embodiments, the autonomous operation may be the ability of the AV to autonomously sense its environment and navigate or drive from a starting location to a destination location autonomously and substantially free of any human user or manual input. According to the Society of Automotive Engineers (SAE), driving automation levels vary from SAE level 0 (constant manual supervision required, with only momentary automated assistance) to SAE level 5 (fully autonomous under all conditions). In certain embodiments, an AV is a vehicle that is rated SAE level 4 or higher.

The use of the term "vehicle" and description with respect to a vehicle is not intended to be limiting or restrictive. The teachings described herein can be used with and applied to any type of vehicle, including those that operate on land (e.g., motorcycles, cars, trucks, buses), on water (e.g., ships, boats), by rail (e.g., trains, trams), aircrafts, spacecraft, and the like.

As used herein, the term "incident" refers to an unsafe condition or a disengagement. For example, an unsafe condition can be an accident or near-accident (e.g., a collision or near-collision), injury to a person, failure of the AV to obey a traffic law, and the like. Disengagements occur when control of an AV is switched from autonomous control to manual control (e.g., control by an operator in a control center remote from the AV or by a person sitting behind manual controls of the AV). When operating in a safe manner, an AV should not require manual intervention. However, when an operator observes that the AV is operating in an unsafe manner, he or she may intervene by, for example, maneuvering the AV to prevent an accident. Thus, incidents may be associated with liability costs (e.g., costs to repair the AV or another vehicle involved in an incident, medical costs, or other types of losses). By extension, the attributes (of an AV, of a route, etc.) which relate to incidents would also be associated with liability costs.

FIG. 1 illustrates an example distributed computing environment 100 for determining an insurance premium according to certain embodiments. Computing environment 100 includes various computing devices and computer systems, such as a user device 110, a rider ordering system 120, an insurance provider system 130, and a remote control system 150 of an AV. As depicted in FIG. 1, these computing devices and systems can be communicatively coupled to each other through one or more communication networks 140.

FIG. 1 is intended to be illustrative. Although FIG. 1 shows certain components of the computing environment 100, it will be understood that the computing environment 100 is not necessarily limited to these components or the exact arrangement of components as depicted in the figure. For example, in other embodiments, certain components may be combined (e.g., ride ordering system 120 and insurance provider system 130), added or omitted.

Communication networks 140 may include wired and/or wireless networks. For example, communication networks 140 can include a WiFi network (implemented according to IEEE 802.XX family standards and/or other mobile communication technologies), a cellular network that supports wireless transmission of voice and/or data, components of a global positioning system (GPS), an Ethernet based network, the Internet, a private or virtual private network, or any combination thereof.

User device 110 is a computing device operated by a user to order an AV ride. User device 110 can be a handheld portable device (e.g., a cellular phone, a computing tablet), a wearable device (e.g., a head mounted display system, a smartwatch), a personal computer, a workstation, a kiosk, or any other computer device. As depicted in FIG. 1, the user device 110 communicates an order 103 to the ride ordering system 120 through communication networks 140. The order 103 includes information indicating a start location and an end location for the AV ride. For example, in certain embodiments, the AV ride is provided as an automated taxi service in which the user specifies a pickup location and a drop-off location. In certain embodiments, the user may also specify a pickup time. Thus, the order 103 may be fulfilled via the ride ordering system 120 communicating instructions to a controller system of an AV to direct the AV to navigate itself to the start location. The start location is typically the current physical location of the user, but can also be a user selected location (e.g., a nearby street intersection) or a location selected by the ride ordering system 120 (e.g., a location between the user and another user being picked up as part of a ride sharing arrangement). The start location and end location can be a street address, a landmark, a bus terminal, an airport, a GPS coordinate, and the like.

In certain embodiments, the user is required to have a user account established with the ride ordering system 120 in order to request an AV ride. As part of creating the user account, the user may provide various types of information associated with the user, such as the user's real name, age, billing address, payment account information (e.g., banking account, credit card, online payment account), desired login credentials (e.g., username, password), and the like. The user account can be created through the user device 110 or some other computing device (e.g., a personal computer) associated with the user.

Ride ordering system 120 includes one or more computing devices configured to respond to AV ride orders from user devices. For example, ride ordering system 120 may include a server that hosts a web page or executes an order management application to receive orders over the Internet, via text message, through email, or other forms of electronic communication. In response to the order 103, the ride ordering system 120 sends a request 105 to the insurance provider system 130. The request 105 includes details relating to the order 103. For instance, request 105 may include the start and end locations, time information indicating when the order 103 was placed, a scheduled pickup time, information identifying an AV to be used for the ride, information regarding the passengers for the ride (e.g., the user, the user's travel companion, a pet), and the like.

The request 105 may identify a particular type of AV. For example, the request 105 may indicate a particular make and model of vehicle specified by the user or selected by the ride ordering system 120 based on vehicle availability and/or user preferences. The request 105 includes information sufficient to permit the insurance provider system 130 to access vehicle data related to the AV. As will be explained, the vehicle data includes one or more attributes that are used to determine the insurance premium for the AV ride. The request 105 does not, however, need to uniquely identify the specific AV to be used for the ride. In certain embodiments, some or all of the vehicle data may be included in the request 105. The vehicle data can also be obtained through other data sources 160.

The vehicle data used to determine the insurance premium can include data relating to a hardware and/or software configuration of the AV. For example a controller system of the AV may be configured to execute a particular version of control software (referred to herein sometimes as an "AV agent") provided by a manufacturer or owner of the AV, and the vehicle data may include data relating to that particular software version. As another example, the AV may be equipped with different types of sensors, and each sensor may have a set of fixed and/or programmable parameters (e.g., field of view, maximum detectable range, sampling frequency). Additional examples of vehicle data that are relevant to determining an insurance premium are described below.

Insurance provider system 130 includes, among other things, an AV insurance premium computation system (IPCS) 132. The IPCS 132 is a computer system configured to determine a value of the insurance premium for the ride that is the subject of the order 103. As described below in connection with the embodiment of FIG. 3, an IPCS can be implemented using one or more pre-trained models configured to predict the insurance premium value (or a value used to compute the insurance premium value) based on evaluation of the risk associated with the AV ride. IPCS 132 can base its predictions on data supplied by the data sources 160. As indicated above, some or all of this data can be included in the request 105 received from the ride ordering system 120. Additionally, in certain embodiments, some or all of the data used to generate the predictions is maintained locally within the IPCS 132 (e.g., in a local database).

In addition to IPCS 132, the insurance provider system 130 can include additional computer systems configured to provide insurance-related services or functionality. For example, insurance provider system 130 may include a separate computation system for determining an insurance premium for a non-AV ride (e.g., a traditional car rental).

Data sources 160 can be implemented as computer-readable storage devices (e.g., disk drives, flash memory, solid state drives) that are coupled to the insurance provider system 130 through a communication interface (e.g., Universal Serial Bus (USB), Peripheral Component Interconnect Express (PCI-e)). In certain embodiments, at least some of the data sources 160 are remote computing devices or systems that communicate with the insurance provider system 130 through communication networks 140. For example, data sources 160 may include a cloud-based data center. As depicted in FIG. 1, the data sources 160 can be sources of the following types of data: a priori data 162, historical data 164, real-time data 166, simulation data 168, and route feature information 170. Data sources 160 may provide various categories of data that are indicative of risk. Examples of such categories include route data, vehicle data, data regarding weather and road conditions, and the like. It should be noted that vehicle data, whether a priori, historical, real-time, etc., does not necessarily have to be data for a specific physical instance of an AV. Instead, vehicle data can be data relating to a specific AV configuration, which may depend, for example, on the make and model of vehicle.

A priori data 162 comprises data regarding the hardware and/or software configuration of the AV to be used for the ride. The a priori data 162 is generated or collected prior to the insurance provider system 130 receiving the request 105 and is typically not subject to change once the AV or the AV agent has been deployed into operation (e.g., upon publication of the software for the AV agent or upon rollout of the AV from the manufacturer's factory). A priori data 162 may include, for example, a sensor coverage map indicating a coverage area of one or more sensors of the AV. The coverage map can be provided by the manufacturer of the AV based on how the one or more sensors have been configured (e.g., the detection range of a radar or LIDAR (Light Detection and Ranging) sensor, the field-of-view of a camera, sampling rate).

Additional examples of a priori data include: test coverage data (e.g., data indicating the extent to which the AV agent has been tested in terms of number of hours of testing, what types of tests have been performed, etc.), AV safety rating (e.g., a score given to the AV by a third-party entity such as the National Highway Traffic Safety Administration), AV reliability rating (e.g., a score determined based on how often the AV breaks down, stalls, overheats, etc.), information identifying the manufacturer of the AV or publisher of the AV agent, vehicle model, software version of the AV agent, information identifying exclusive or proprietary hardware (e.g., radar, camera) on the AV, information indicating whether a particular combination of sensors is available (e.g., radar plus camera, camera plus LIDAR), and information indicating whether the AV comes equipped with special hardware (e.g., snow tires, which may be relevant to evaluating risk depending on time of year, weather, or geography).

Historical data 164 is data obtained over a relatively long period of time (e.g., days, months, years). Historical data can pertain to attributes of the AV (i.e., vehicle data), attributes of a route and/or attributes of weather and road conditions. Examples of historical vehicle data include the total number of disengagements for the AV agent in a certain period of time (e.g., the past 3-6 months, past year), AV maintenance history and AV software update history. A disengagement occurs when control over an AV is switched over from autonomous control by an AV agent to manual control by a human operator (e.g., a person in a remote control center who monitors the status of the AV based on telemetry data sent from the AV, or a person inside the AV with access to manual controls). Disengagements can be momentary or last for the remaining duration of a trip (e.g., a single ride). For example, in response to determining that the AV is behaving in an unsafe manner, a remote operator could, using a teleoperations system, take over control to avoid an accident and then give back control to the AV agent once the accident has been avoided. An example of historical data relating to a route is accident history for locations along a route (e.g., last thirty days or last six months of recorded accidents for any road, highway, etc. through which the route extends). An example of historical data relating to weather and road conditions is road work history.

Real-time data 166 is data obtained at a time associated with the AV ride. For example, the time associated with the ride can be a time of the order 103. Alternatively, the time associated with the ride can be a future time (e.g., a pickup time determined by the ride ordering system 120 or specified by the user). Thus, real-time data 166 can be order-time based or ride-time based. Real-time data 166 is obtained for a window of time significantly shorter than that of historical data 164 (e.g., hours instead of days). The time window for which to obtain real-time data 166 is relative to the time associated with the ride, and the request 105 may indicate the time associated with the ride so that the insurance provider system 130 can access the data for the relevant time window.

In a scenario where the user is being picked up immediately, the real-time data 166 will generally be obtained at a time of the order 103 (e.g., as soon as the request 105 is received) and will be for a time window relative to the time of the order 103. For example, if the user books a ride on Monday at 3 PM for immediate pickup, insurance provider system 130 may access data relating to a time window counting backward from 3 PM on Monday.

In a scenario where the user is being picked up at a later time, the real-time data 166 can be obtained at the time of the order 103 and/or at the time of the ride. For example, if the user books a ride on Monday at 3 PM for a ride occurring at 8 PM on the upcoming Thursday, the insurance provider system 130 may, at the time of the order 103, access data for a time window counting backward from 8 PM on Thursday. For example, insurance provider system 130 could obtain a weather forecast for the time period between 7 PM and 9 PM on Thursday. Similarly, insurance provider system 130 could obtain an estimate for traffic conditions between 7 PM and 9 PM on Thursday. In certain embodiments, real-time data 166 may be obtained at the time of the ride. For example, in addition or as an alternative to obtaining (on Monday) the weather forecast for Thursday, the insurance provider system 130 could (on Thursday) obtain an updated forecast and/or actual weather measurements. The insurance provider system 130 may, in certain embodiments, use data obtained at the time of the ride to determine an updated insurance premium value. If the updated insurance premium value exceeds a previously determined insurance premium value by a certain amount, the ride ordering system 120 may allow the user the option of canceling the ride or accepting a new price computed based on the updated insurance premium value.

Examples of real-time data relating to a vehicle include: a list of currently active in-vehicle diagnostics, a list of in-vehicle diagnostics for the last n number of hours (where n can be any number), the number of interventions needed in the last n hours, and a vehicle health index (e.g., a score representing the overall health of an AV based on the values of a set of vehicle attributes over the window of time). In certain embodiments, the vehicle health index is computed based on information indicating the health of sensors (e.g., an individual score based on the operating capabilities of each sensor relative to their maximum or normal operating capabilities), computer processors, an in-vehicle communication interface, and/or other components in the AV.

Examples of real-time data relating to a route include: total distance to travel from start location to end location (e.g., based on a route determined by ride ordering system 120 or insurance provider system 130), and the level of traffic congestion at the time of the ride. In certain embodiments, real-time data may include a pickup and drop-off complexity index (PDCI) and/or a route complexity index (RCI). PDCI and RCI can be computed using pre-trained models and are values indicating the degree of complexity associated with the route or the start/end locations. PCDI represents the degree of complexity or difficulty involved in navigating around the start and end locations. RCI represents the degree of complexity or difficulty in navigating along the overall route. Higher complexity indicates higher risk of incident.

Additional examples of real-time data relating to a route include: time of ride start (in some embodiments, this defaults to the time of order 103), city or postal code of start/end location, total expected travel time, proportion of travel time and/or distance expected to be spent on highway/freeway, proportion of travel time and/or distance expected to be spent on local roads (e.g., percent of expected travel time on local roads relative to total expected travel time), proportion of time spent on undivided roads, information identifying major highways to be taken during the ride and information regarding such highways (e.g., accident statistics or other safety-relevant information). In some embodiments, real-time data may include a pedestrian index indicating the relative rank ordering of different intersections along the route with regard to the presence of pedestrians. The pedestrian index can be a single value or set of values (e.g., min/max/average) specified at any magnitude or level of granularity (e.g., 1-10 meters, 1-100 meters).

PDCI can be computed based on one or more factors such as: minimum turning radius of the AV, lane width at the start/end location, whether there is a curb at the start/end location, the presence of objects or materials (e.g., trees) at the start/end location that could potentially obstruct or occlude the views of the AV's sensors, whether the start/end location is near a crosswalk/blind intersection/area of high pedestrian traffic, etc.

In certain embodiments, PCDI is computed as the expected number of maneuvers the AV will make (e.g., total number of speed, steering, braking, and/or other control adjustments) over the course of the route and based on attributes of the start and end locations. PDCI can be computed using a pre-trained model (e.g., a regression model that estimates the number of maneuvers required). The model for computing PDCI can be trained using historical data associated with different real-world locations that vary in their characteristics (e.g., lane width, cross walk, intersections, other road features). If the model for computing PDCI is a regression model, the training data may be fit to a mathematical function (e.g., a linear function) to enable the model to predict the total number of maneuvers needed for any given pair of start and end locations (e.g., the pickup and drop-off locations for the AV ride that is the subject of order 103). The output of a fitted regression model can be represented as follows:

$$PDCI=f(\text{lane width, cross walk indicator, number of intersections, etc.})$$

RCI can be computed based on one or more factors such as: number of traffic lights, number of traffic signs, number of protected left turns, number of unprotected protected left turns, number of uncontrolled right turns, number of uncontrolled left turns, number of U-turns needed, number of lane changes needed, number of merges needed, number of 4-way stops, distance of any bicycle paths along the route, and distance motorcyclists are allowed to drive in-between vehicles. Like PDCI, the value of the RCI can be computed using a pre-trained model. In certain embodiments, PDCI and RCI are combined to calculate an overall route complexity index (ORCI):

$$ORCI=f(PDCI,RCI)$$

Examples of real-time data relating to weather and road conditions include information on: whether the ride will occur during day time or night time, whether it is currently raining/snowing or expected to rain/snow during the ride (and if so, the extent of the rain/snow, e.g., drizzle, downpour, blizzard, etc.), whether it is currently foggy or expected to be foggy, and wind strength.

Simulation data 168 is data obtained through computer simulation of the operation of an AV. Simulation data is typically generated by the publisher of an AV agent during testing or training of the AV agent. The behavior of the AV agent (e.g., steering, acceleration, or braking decisions) is observed under different conditions that can involve any of the above-mentioned historical, a priori, and real-time data. Simulation involves testing different combinations of possible data values. Simulations can be run within a model of a real-world environment (e.g., a model replicating the actual street layout of a city) or within a model of an environment that has no real-world counterpart. Like actual data, simulation data 168 can indicate whether an incident occurred and the values of attributes present when an incident occurred. Simulation data 168 can be used to supplement actual data. Simulation data 168 can also be used as an alternative to using actual data for determining an insurance premium when little or no actual data is available, such as following initial deployment of the AV or AV agent (the same AV agent may be deployed at different times on multiple AVs having the same or different hardware configurations).

Route feature information 170 comprises data on features along a route and indicates the locations and/or other attributes of such features. Route feature information 170 may represent a detailed map of a geographical area, from which map details of the features along the route can be obtained. Details of such features may include, for example, information on the geographical location (e.g., GPS coordinates) of landmarks, traffic lights, traffic signs, street intersections, highway entrances and exits, points of interest, and the like, along with other information such as size, distance, speed limit, total population, population density, etc.

Other types of data that may be provided by data sources 160 and used to determine the insurance premium for the AV ride include: demographic information such as proportion of fully automated vehicles (e.g., SAE level 4 or higher) in the geographic area of the AV ride, proportion of semi-automated vehicles (e.g., SAE level 3 or lower) in the geographic area of the AV ride, proportion of manually operated vehicles in the geographic area of the AV ride, and information indicating whether there is a special event occurring along or near a planned route (e.g., a sports game, festivals, music concerts, traffic-heavy holidays such as Thanksgiving and the Fourth of July).

Data sources 160 are not necessarily associated with a single entity. For example, route data can be provided by ride ordering system 120, vehicle data can be provided by an AV manufacturer or ride ordering system 120, weather data can be provided by an Internet-based weather service, demographic data can be provided by a local department of motor vehicles, and information regarding special events can be based on a calendar created and maintained by the insurance provider system 130.

Upon determining the value of the insurance premium for the AV ride, the insurance provider system 130 communicates the value of the insurance premium to the source of the request 105 (i.e., ride ordering system 120). The insurance provider system 130 communicates the value of the insurance premium as part of a response that can include additional information associated with the insurance premium. For example, the response sent by the insurance provider system 130 may include a recommended price to charge the user for the AV ride, where the price was determined by the insurance provider system 130 taking into consideration the insurance premium value plus other factors such as, for example, a base price for the ride (e.g., based on total distance to be traveled), a profit margin, a cost overhead or operating expenses attributed to use of the AV, or other factors relevant to determining how much the ride ordering system 120 should charge for the AV ride.

In certain embodiments, the insurance provider system 130 determines a separate insurance premium value for each route in a set of potential routes between the start and end locations. The insurance provider system 130 then identifies an optimal route (e.g., the safest route) to take for the AV ride based on these insurance premium values (e.g., whichever route has the lowest insurance premium value), and communicates this identified route to the ride ordering system 120. Alternatively, the insurance provider system 130 could communicate the multiple insurance premium values to the ride ordering system 120 (e.g., as part of insurance premium information 107) and then ride ordering system 120 could decide which route to take based on the insurance premium values. If the route to take is selected as whichever route is associated with the lowest insurance premium value, this would minimize the risk for the AV ride while also minimizing the insurance premium charged to the user.

Further, as explained below in connection with the embodiment of FIG. 2, the insurance premium value returned to a ride ordering system or other source of a request for an AV ride can be computed as a final insurance premium value based on premium values for different categories. For example, the final insurance premium value may be computed based on a premium value associated with the route category, a premium value associated with the vehicle category, and so on. Accordingly, in certain embodiments, which route to take among a set of possible routes can be based on a premium value associated with a particular category rather than the overall or final insurance premium value. For instance, the insurance provider system 130 or the ride ordering system 120 may be configured to select the route having the lowest premium value for the route category, thus prioritizing the route category over other categories (e.g., vehicle, weather and road condition). This configuration may be performed, for example, through a user interface of an administrative user, or based on input from the user requesting the AV ride (in which case the category to be prioritized may be indicated in the order 103).

The data depicted in FIG. 1 under data sources 106 is generally stored in a computer-readable format indicating values for different attributes under the vehicle, route, weather and road condition, or other categories. When input to a pre-trained model, this data may be represented as an indexed set of attribute values, e.g., a feature vector in which each attribute to be used for determining a risk value, loss value, or other output value of the pre-trained model is indexed to a particular location in the feature vector, with each indexed location having a binary value or 1 or 0. Some of the indices may be determined prior to training of the model (e.g., set by an administrator of insurance provider system 130). However, not every attribute to be used as input to a pre-trained model needs to be determined prior to training. That is because one of the goals of machine learning, whether thorough use of linear regression, logistic regression, neural networks, or some other form of artificial intelligence-based modeling, is to identify which attributes are relevant for performing a particular computational task. For example, attributes may be input to a regression model as independent variables to identify relationships between the attributes and one or more dependent variables (e.g., occurrence of an incident) and to fit the regression model to the identified relationships. In the process of identifying the relationships, the attributes which are most closely related to the one or more dependent variables may be identified and chosen for use in subsequent predictions.

The data examples enumerated above are not intended to be an exhaustive list of every possible piece of data that can be used for determining an insurance premium. Neither are the data examples above intended to represent the minimum required information for determining an insurance premium. Instead, an insurance premium can be determined based on a subset of the data examples above.

The response from the insurance provider system 130 can include, in addition to the final insurance premium value, other associated information. For example, in certain embodiments, the response from the insurance provider system 130 indicates how the final insurance premium value is broken down (e.g., the relative contribution of each category of data along with other price components of the final insurance premium value such as cost overhead and profit margin). Upon receiving the final insurance premium value, the ride ordering system 120 generates and sends the response 109 to the user device 110. Response 109 generally indicates the total price of the AV ride, which comprises some base price charged by the ride ordering system 120 (e.g., a price based on total distance for the ride) plus the final insurance premium value.

Although not shown in FIG. 1, additional communications may occur between user device 110 and ride ordering system 120 before the order 103 is fulfilled. For instance, the total price of the AV ride can be output on a display of the user device 110 and the user can, in response to viewing the total price of the AV ride, make a decision on whether to proceed with or cancel the AV ride. Upon deciding to proceed with the ride, the user may cause the user device 110 to send a message to the ride ordering system 120 indicating that the user has agreed to proceed (and thus accepts the total price of the AV ride). In response to this message, the ride ordering system 120 may charge the user's payment account and send a confirmation (e.g., a message with an attached payment receipt) to the user device 110. Concurrent with the sending of the confirmation, the ride ordering system 120 may send an instruction to the specific AV being used for the ride. The instruction may cause the AV to navigate directly to the start location or pick up the user at some later time (e.g., based on the user's place in a ride sharing queue). Thus, the AV can be dispatched in response to receipt of a communication from the user device 110 indicating that the user accepts the total price of the ride.

Remote control system 150 is a teleoperation system that can be used to monitor the activity of the AV being used for the ride and permit a remote operator (e.g., a person in a control center) to take control of the AV when needed. For example, the remote operator may take over when requested to by the AV (e.g., in response to the AV detecting an emergency situation) or to manually override an autonomous operation that is likely to cause an accident. Remote control system 150 receives live sensor data from the AV (e.g., a video stream from one or more on-board cameras) and presents the received sensor data to the remote operator through a computer display or other output device.

Figure 2:
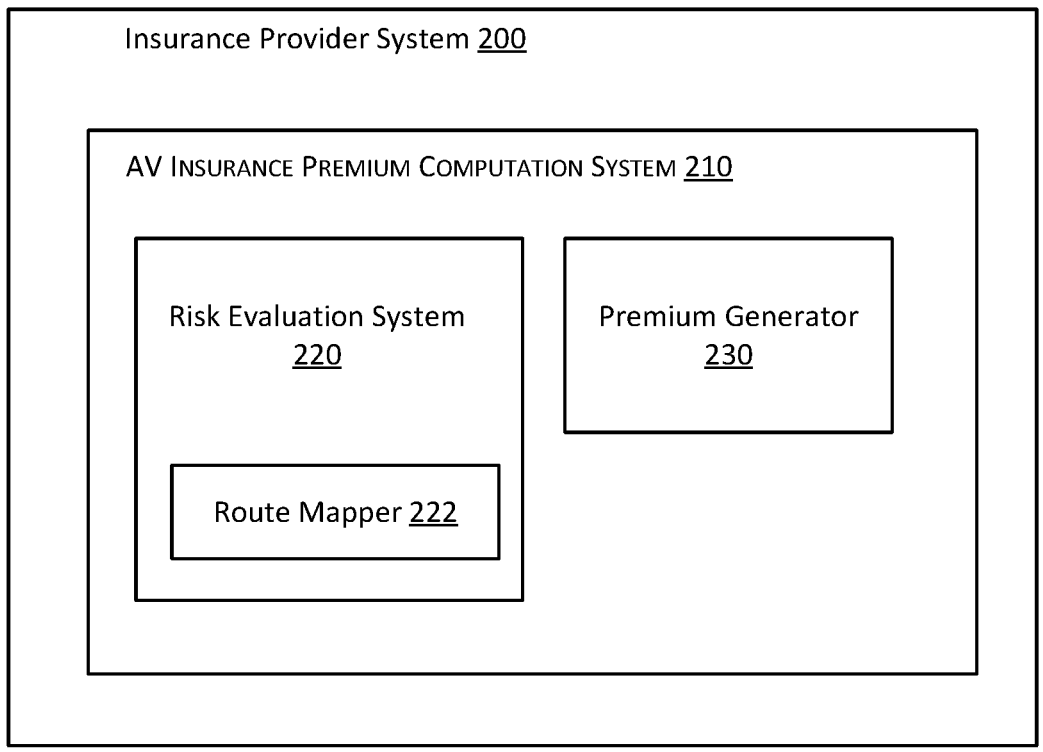
FIG. 2 is a simplified block diagram of an insurance provider system according to certain embodiments.

FIG. 2 is a simplified block diagram of an insurance provider system 200 according to certain embodiments. Insurance provider system 200 is an embodiment of insurance provider system 130 in FIG. 1. The insurance provider system 200 includes an insurance premium computation system 210 that is analogous to IPCS 132 in FIG. 1. IPCS 210 is a computer system configured to determine a value of an insurance premium for an AV ride being booked by a user. As depicted in FIG. 2, IPCS 210 includes a risk evaluation system 220 and a premium generator 230. Although shown as separate blocks, risk evaluation system 220 and a premium generator 230 can be implemented on single device, e.g., a computer system with one or more processing units that execute software instructions which implement the functionality of these blocks.

Risk evaluation system 220 includes one or more models configured to predict a risk value and a loss value for a given set of input attributes (e.g., attributes associated with an AV ride being booked by a user). The one or more models are pre-trained using real and/or simulated data as input observations. The training enables the one or more models to predict a risk value as the likelihood of an incident (probability of incident or PI) given a set of non-training input. The training also enables the one or more models to predict, based on non-training input, a loss value as a liability given an incident (LGI). Thus, the risk value represents the answer to the question "what is the likelihood that there will be an incident if this particular set of attribute values (relating to vehicle, route, weather and road condition, etc.) is associated with the AV ride?" and the loss value represents the answer to the question "what is the expected loss (e.g., as a dollar amount) of an incident that occurs under this particular set of attribute values?"

In certain embodiments, the risk evaluation system 220 is configured to determine one or more routes for an AV ride (e.g., using a start location and an end location as inputs to a route mapper 222). For instance, risk evaluation system 220 can determine a single route corresponding to the shortest possible route or based on other considerations. Alternatively, as indicated above, in some embodiments, the risk evaluation system 220 determines multiple routes and selects one of the routes to use for the AV ride, e.g., whichever route has the lowest insurance premium associated with it. After the route(s) have been determined, route-related data can be accessed and used as input for determining the risk value and/or loss value. Alternatively, risk evaluation system 220 may receive the route(s) from some other entity, such as an Internet-based mapping service.

Premium generator 230 computes a final premium value based on the risk value and the loss value determined by the risk evaluation system 220. The premium generator 230 can calculate the final premium value according to one or more rules, e.g. rules implemented using a deterministic algorithm.

In certain embodiments, premium generator 230 computes (or receives from risk evaluation system 220) an overall expected loss (EL) for the AV ride as the product of PI and LGI:

$$EI = PI * LGI$$

After obtaining the overall expected loss, the premium generator 230 calculates the final premium value according to a preconfigured pricing model that specifies the final premium value as a mathematical function of overall expected loss and other factors, for example:

Final Premium=Overall Expected Loss+Administrative Cost+Profit Margin where administrative cost is the AV ride's pro rata share of some fixed overhead and profit margin can be set at the discretion of an operator of the ride ordering system. Additional factors can be taken into consideration when computing the final premium value. For example, the final premium value may be required to be a value that results in a return on equity (ROE) being greater than some financial target.

Figure 3:
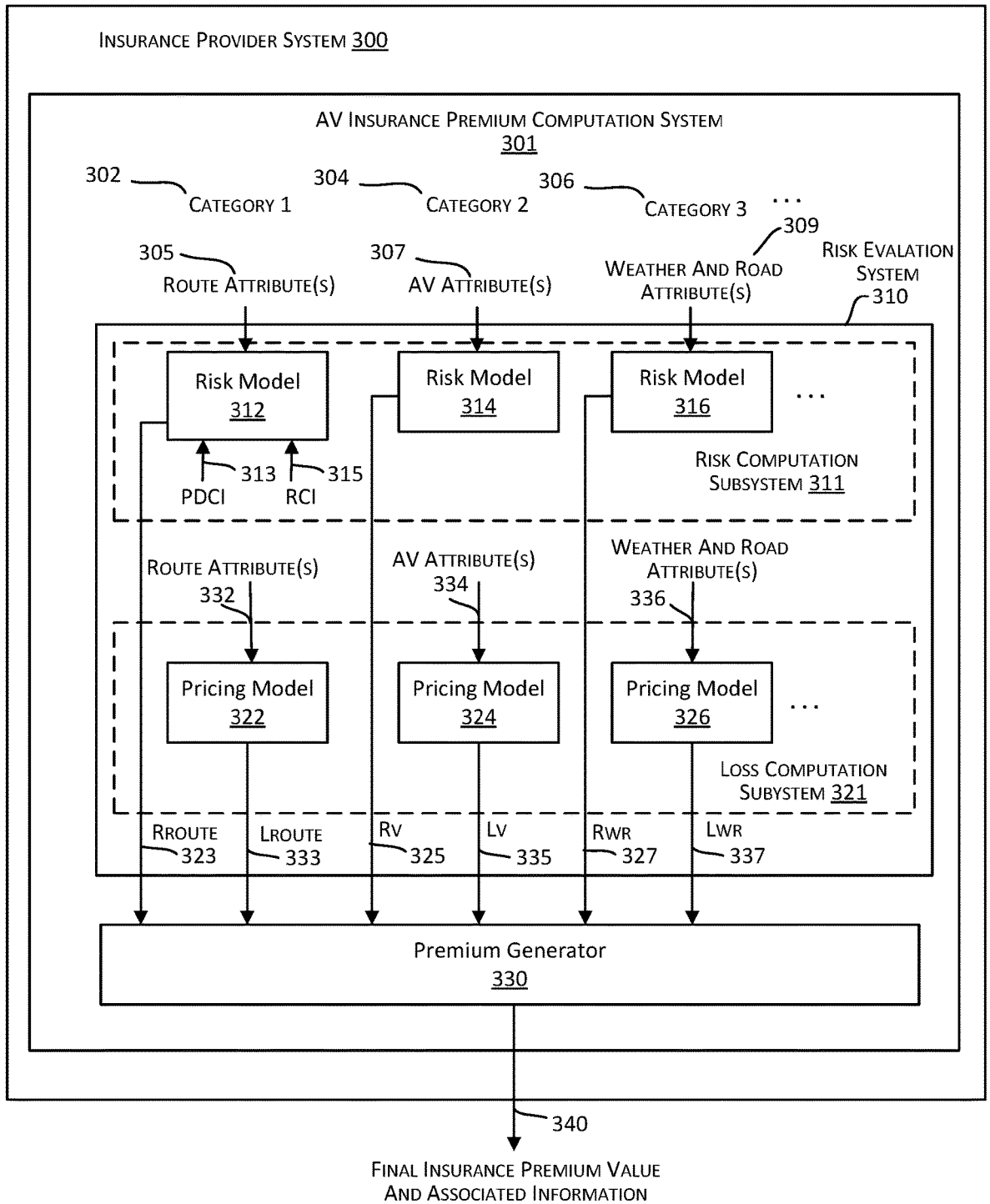
FIG. 3 is a simplified block diagram of an insurance provider system according to certain embodiments.

FIG. 3 is a simplified block diagram of an insurance provider system 300 according to certain embodiments. The insurance provider system 300 includes an IPCS 301. The IPCS 301 can be used to implement the IPCS 132 of FIG. 1 or the IPCS 210 of FIG. 2. As depicted in FIG. 3, IPCS 301 includes a risk evaluation system 310 and a premium generator 330.

Risk evaluation system 310 is analogous to risk evaluation system 220 in FIG. 2 and includes a risk computation subsystem 311 and a loss computation subsystem 321. As depicted in FIG. 3, the risk computation subsystem 311 is configured to receive as input a set of attributes for different categories, including a first category 302 of route-related data, a second category 304 of AV-related data, and a third category 306 of weather and road condition-related data. In other embodiments, the risk evaluation system 310 may be configured to process attributes for additional categories or categories different from that shown in FIG. 3. For example, in certain embodiments, the categories to use for determining the final insurance premium value are configurable, e.g., through a user interface of the IPCS 301.

Risk computation subsystem 311 includes one or more pre-trained risk models for determining a risk value based on a set of attribute values. In some embodiments, risk computation subsystem 311 is implemented using a single pre-trained risk model (e.g., a neural network) that predicts an overall risk value from a set of attribute values for multiple categories. In the embodiment depicted in FIG. 3, the risk computation subsystem 311 includes a separate risk model for each category 302, 304, 306. In particular, the risk computation subsystem 311 includes a risk model 312 for processing route attributes 305, a risk model 314 for processing AV attributes 307, and a risk model 316 for processing weather and road condition attributes 309.

Each risk model 312, 314, 316 is a machine-learning model configured to predict or estimate a risk value for a particular category. For example, the output of risk model 312 is a risk value ($R_{ROUTE}$) 323 representing the probability of an incident given route attributes 305. Similarly, the output of risk model 314 is a risk value ($R_V$) 325 representing the probability of an incident given AV attributes 307, and the output of risk model 316 is a risk value ($R_{WR}$) representing the probability of an incident given weather and road condition attributes 309. The risk values 323, 325, 327 are provided as input to the premium generator 330 and represent a relative contribution of each category to overall risk of incident.

As depicted in FIG. 3, the input to risk model 312 can include a pickup and drop-off complexity index (PDCI) 313 and a route complexity index (RCI) 315. In certain embodiments, PDCI 313 and RCI 315 are each computed using additional models within risk evaluation system 310. The models used to compute PDCI 313 and RCI 315 can be models that have been trained using the attributes described above in connection with PDCI and RCI and the embodiment of FIG. 1.

Training of the risk models 312, 314, 316 is based on observations of whether an incident occurred when a particular combination of attribute values was present. Additionally, as discussed below in connection with the embodiment of FIG. 7, risk can be measured even in the absence of an incident, since the AV may engage in behavior that is likely to cause an incident even if the behavior does not actually result in an incident. Thus, training data can include example attribute values and data indicating the level of risk associated with those attribute values.

An incident may be defined according to a set of one or more rules that specify the conditions under which an event is classified as an incident. For example, collisions between the AV and a vehicle, motorcyclist, obstacle, object, etc. may be deemed incidents. Collisions may be deemed incidents even when there were no passengers in the AV at the time of collision. Events resulting in physical injury to a passenger (e.g., whiplash, concussion) may be deemed incidents even if there was no collision. Theft of the AV may be treated as an incident. Another example of an incident is when the AV managed to avoid a collision but stopped too close (e.g., based on a threshold distance) to the other vehicle or object or stopped too suddenly (e.g., exceeding a threshold deceleration rate). Yet another example of an incident is a driving operation that resulted in a violation of a traffic law or expected traffic norm (e.g., turning without proper signaling, failure to maintain a certain following distance to the vehicle in front of the AV, stopping in the middle of an intersection). As mentioned earlier, a disengagement can also be treated as an incident. Thus, an incident can be an unsafe condition or a disengagement.

In certain embodiments, each risk model 312, 314, 316 is trained through regression (e.g., Generalized Linear Model (GLM) or Ordinary Least Squares (OLS) based regression). However, regression is not the only technique available for training a model. For instance, in some embodiments, training is based on Chi-square based automatic interaction detection (CHAID), which as decision tree-based technique for prediction and determining relationships between variables. The training determines parameters of the risk model through fitting to the observations. The parameters of the risk model may include, for example, weights associated with each attribute, where the value of a weight indicates the level of impact of the attribute on risk of incident. Training can be performed more than once. For instance, after some initial training on simulation data, real data may become available and incorporated into a training corpus to retrain the risk model.

In a regression-based risk model, the risk value may be expressed as follows:

$$PI = \frac{1}{\left(1 + e^{-(a+\sum_1^n bi*Xi)}\right)}$$

where Xi is an input variable (i.e., a value of an attribute) among a set of n number of variables, bi is a weight assigned to the input variable, and the parameter a represents some initial value.

As mentioned earlier, a risk model can operate on real and/or simulation data. The same applies to the pricing models described in connection with loss computation subsystem 321 below. When both real and simulation data are used, a risk/pricing model may assign a greater weight to real data so that the values of the real data influence the resulting risk or loss value to a greater degree compared to simulation data.

Loss computation subsystem 321 can operate in parallel with risk computation subsystem 311. Loss computation subsystem 321 includes one or more pre-trained pricing models for determining a loss value based on a set of attribute values. In the embodiment depicted in FIG. 3, the loss computation subsystem 321 includes a separate pricing model for each category 302, 304, 306. In particular, the loss computation subsystem 321 includes a pricing model 322 for processing route attributes 332, a pricing model 324 for processing AV attributes 334, and a pricing model 326 for processing weather and road condition attributes 336.

In some embodiments, loss computation subsystem 321 is implemented using a single pre-trained pricing model that predicts an overall loss value from a set of attribute values for multiple categories. In fact, risk computation subsystem 311 and loss computation subsystem 321 can, in certain embodiments, be combined into a single model that receives a set of attributes and outputs both a risk value and a loss value, either for a single category or for all categories. It should be noted, however, that the set of attributes used for determining a risk value is not necessarily identical to the set of attributes used for determining a loss value. For example, the route attributes 305 that are input to risk model 312 are not necessarily the same as the route attributes 332 that are input to pricing model 322. Although there may be some degree of overlap between the attributes used by risk computation subsystem 311 and the attributes used by loss computation subsystem 321, certain attributes that are relevant to determining a risk value may not be relevant to determining a loss value and vice versa. For example, the total number of passengers in the AV and the ages of the passengers may be more relevant to computing LGI and, in some embodiments, are not taken into consideration when computing PI. Further, even when the same attributes are used between risk computation subsystem 311 and loss computation subsystem 321, they may be weighted differently.

The pricing models 322, 324, 326 are machine-learning models that can be trained in a similar manner as described above with respect to risk models 312, 314, 316. However, the training of the pricing models 322, 324, 326 seeks to model the relationship between attributes and liability. Thus, the training data used to train the pricing models includes observations regarding the monetary cost of incidents. In a regression-based pricing model, the loss value may be expressed using the following multiple regression equation:

$$LGI = c + \sum_1^n di*Xi$$

where Xi is an input variable among a set of n number of variables (Xi and n in the equation for LGI are not necessarily the same as in the above equation for PI), di is a weight assigned to the input variable, and the parameter c represents some initial value.

Each pricing model 322, 324, 326 is configured to predict or estimate a loss value for a particular category. For example, the output of pricing model 322 is a loss value ($L_{ROUTE}$) 333 representing the liability given an incident involving route attributes 332. Loss value 333 therefore represents a loss associated with the route attributes 332. Similarly, the output of pricing model 324 is a loss value ($L_V$) 335 representing the liability given an incident involving AV attributes 334, and the output of pricing model 326 is a loss value ($L_{WR}$) representing the liability given an incident involving weather and road condition attributes 336. These loss values 333, 335, 337 are provided as input to the premium generator 330 and represent the relative contribution of each category to an overall liability.

Premium generator 330 is analogous to premium generator 230 in FIG. 2 and is configured to compute a final insurance premium value 340. The computation of the final insurance premium value 340 can be based on an overall expected loss, e.g., the sum of the overall expected loss plus administrative cost and profit margin. For instance, the premium generator 330 may compute the overall expected loss (EL) as an arithmetic or weighted sum of expected losses across all categories, where the expected loss for a particular category is computed based on the risk value and loss value for that particular category (e.g., overall expected loss=$R_{ROUTE}*L_{ROUTE}+R_V*L_V+R_{WR}*L_{WR}$). Thus, the expected loss for a particular category represents a premium value for that particular category and can be combined with expected losses for other categories to compute the final premium value. In some embodiments, the overall expected loss and/or the expected loss for a particular category may be computed by risk evaluation system 310 and provided as an input to premium generator 330.

In certain embodiments, the overall expected loss is computed with finer granularity. For example, the computation of the overall expected loss may treat fatal incidents (e.g., those resulting in death of a passenger or other person) differently than non-fatal incidents. Thus, the overall expected loss could be expressed as:

$$EL=PF*LGF+(1-PF)*LGNF$$

where PF is a probability of an incident being fatal when there is an incident, LGF is a liability given a fatal incident, and LGNF is a liability given a non-fatal incident. The risk models and pricing models of the risk evaluation system 310 can be trained accordingly. For example, PF can be modeled in a similar manner to PI, and LGF and LGNF can be modeled in a similar manner to LGI.

Premium generator 330 outputs the final insurance premium value 340 and, optionally, additional information associated with the final insurance premium value 340. Such additional information can include, for example, the relative contribution of each category 302, 304, 306 to the final insurance premium value 340 or the profit margin used to compute the final insurance premium value 340. Premium generator 330 may output the final insurance premium value 340 as part of a message communicated to a ride ordering system (e.g., ride ordering system 120 in FIG. 1) or other source of a request for the insurance premium value.

As indicated above, in certain embodiments, multiple routes are evaluated. Thus, the risk model 312 could be used to predict a risk value for an alternate route, pricing model 322 could be used to predict a loss value for the alternate route, and a second insurance premium value could be calculated and compared to the insurance premium value 340 to select, based on the comparison, one of the routes for use during the AV ride (e.g., whichever route is associated with the lowest premium value).

Figure 4:
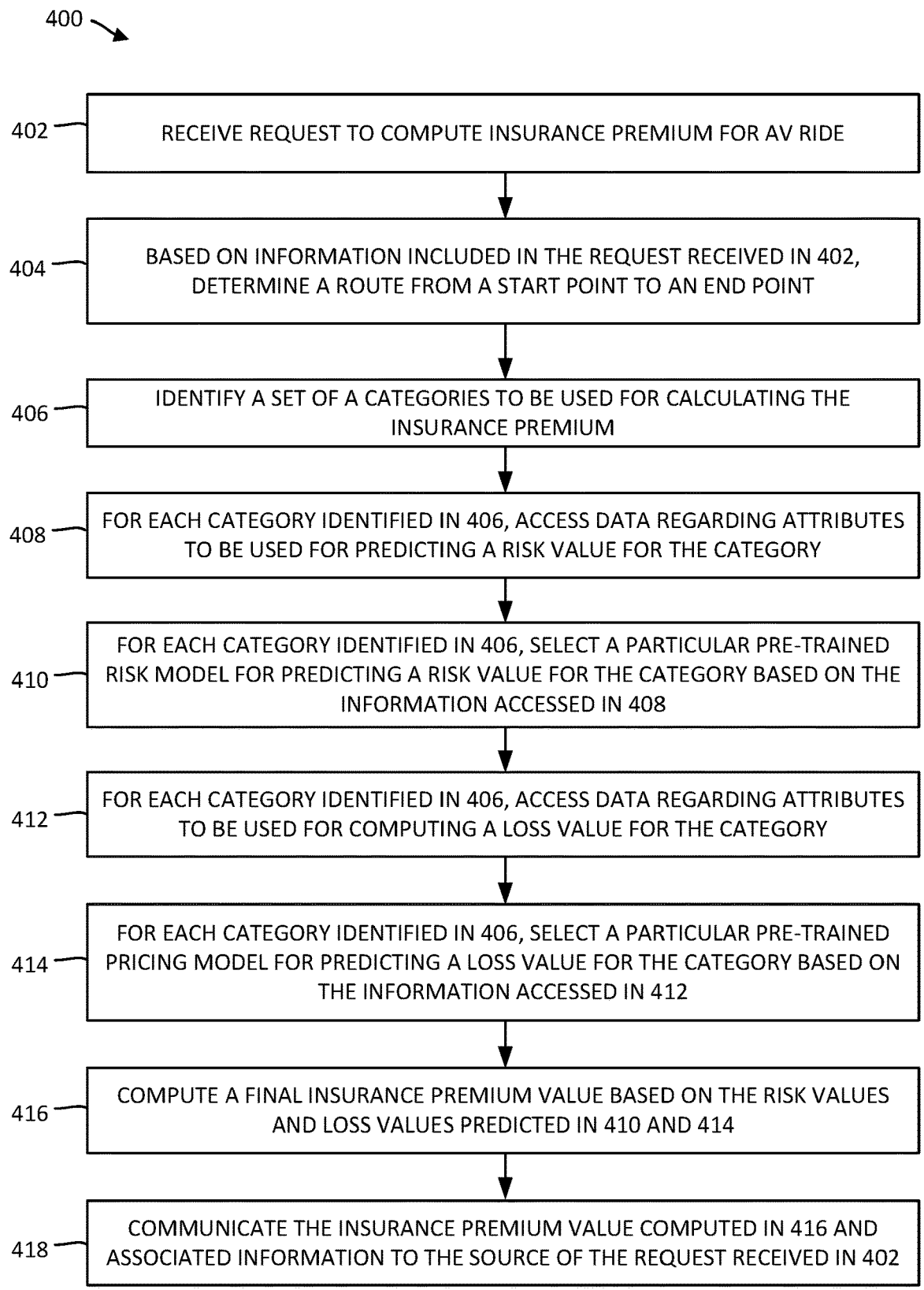
FIG. 4 is a flow chart illustrating a process for determining an insurance premium for an AV ride according to certain embodiments.

FIG. 4 is a flow chart 400 illustrating a process for determining an insurance premium for an AV ride according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1 and 3, the processing depicted in FIG. 4 may be performed by an insurance provider system (e.g., insurance provider system 130 or insurance provider system 300).

At 402, a request to compute an insurance premium for an AV ride being booked by a user is received (e.g., from ride ordering system 120). The request includes information on a start location (e.g., a point A) and an end location (e.g., a point B) for the ride. The request can include other information to be used as input for computing the insurance premium, such as the information regarding the passengers (e.g., total number of passengers, age of passengers, pickup time).

At 404, based on the information included in the request received in 402, a route is determined from the start location to the end location. For example the insurance provider system may compute a route having the shortest travel time or least distance from point A to point B. The route can be computed locally or communicated to the insurance provider from an external mapping service. In some embodiments, details of the route (e.g., turn-by-turn navigation or driving instructions) may be included in the request received in 402 so that the insurance provider system does not have to determine the route.

At 406, a set of categories to be used for calculating the insurance premium are identified. These categories correspond to route, vehicle, weather and road conditions, and/or other categories of data that are relevant to calculating the insurance premium for the AV ride.

At 408, for each category identified in 406, data regarding attributes to be used for predicting a risk value for the category is accessed. Some of this data may be included as part of the request received in 402. Some of the data may be stored and maintained locally by the insurance provider system. Still other portions of the data may be provided by third-party entities (e.g., a weather service) that form the data sources 160 in FIG. 1. The data accessed in 408 includes real-time information, a priori information, and historical information.

At 410, for each category identified in 406, a particular pre-trained risk model (e.g., one of the risk models 312, 314, or 316 in FIG. 3) is selected from among a plurality of pre-trained risk models (which can include, in some embodiments, additional risk models besides risk models 312, 314, and 316) for use in predicting the risk value for the category. The selection of the risk model is performed automatically. The selected risk model is executed to output the risk value for the category based on input corresponding to relevant portions of the data accessed in 408 (e.g., based on the values of the attributes for the category).

At 412, for each category identified in 406, data regarding attributes to be used for predicting a loss value for the category is accessed. As with the data accessed in 408, some of the data accessed in 412 may be included as part of the request received in 402, stored locally, or provided by a third-party entity. Similarly, the data accessed in 412 includes real-time information, a priori information, and historical information.

At 414, for each category identified in 406, a particular pre-trained pricing model (e.g., one of the pricing models 322, 324, or 326 in FIG. 3) is selected from among a plurality of pre-trained pricing models (which can include, in some embodiments, additional pricing models besides pricing models 322, 324, and 326) for use in predicting the loss value for the category. The selection of the pricing model is performed automatically. The selected pricing model is executed to output the loss value for the category based on input corresponding to relevant portions of the data accessed in 412 (e.g., based on the values of the attributes for the category).

At 416, a final insurance premium value is computed based on the risk values and loss values computed for the multiple categories, i.e., the values predicted in 410 and 414. In some embodiments, the final insurance premium value is computed as a function of an expected loss, where the expected loss is in turn a function of the risk values predicted in 410 and the loss values predicted in 414. For example, an overall risk value corresponding to the probability of incident (PI) may be computed based on a weighted combination of the risk values predicted in 410, an overall loss value corresponding to the liability given incident (LGI) may be computed based on a weighted combination of the loss values predicted in 414, and the overall risk value may be combined (e.g., multiplied) with the overall loss value to calculate the expected loss. Alternatively, as indicated above, in certain embodiments, an expected loss or premium value can be computed for an individual category and combined with expected losses or premium values for other categories to compute the final insurance premium value.

At 418, the final insurance premium value computed in 416 is communicated, possibly along with various items of information associated with the final insurance premium value, to the requestor that was the source of the request received in 402.

Figure 5:
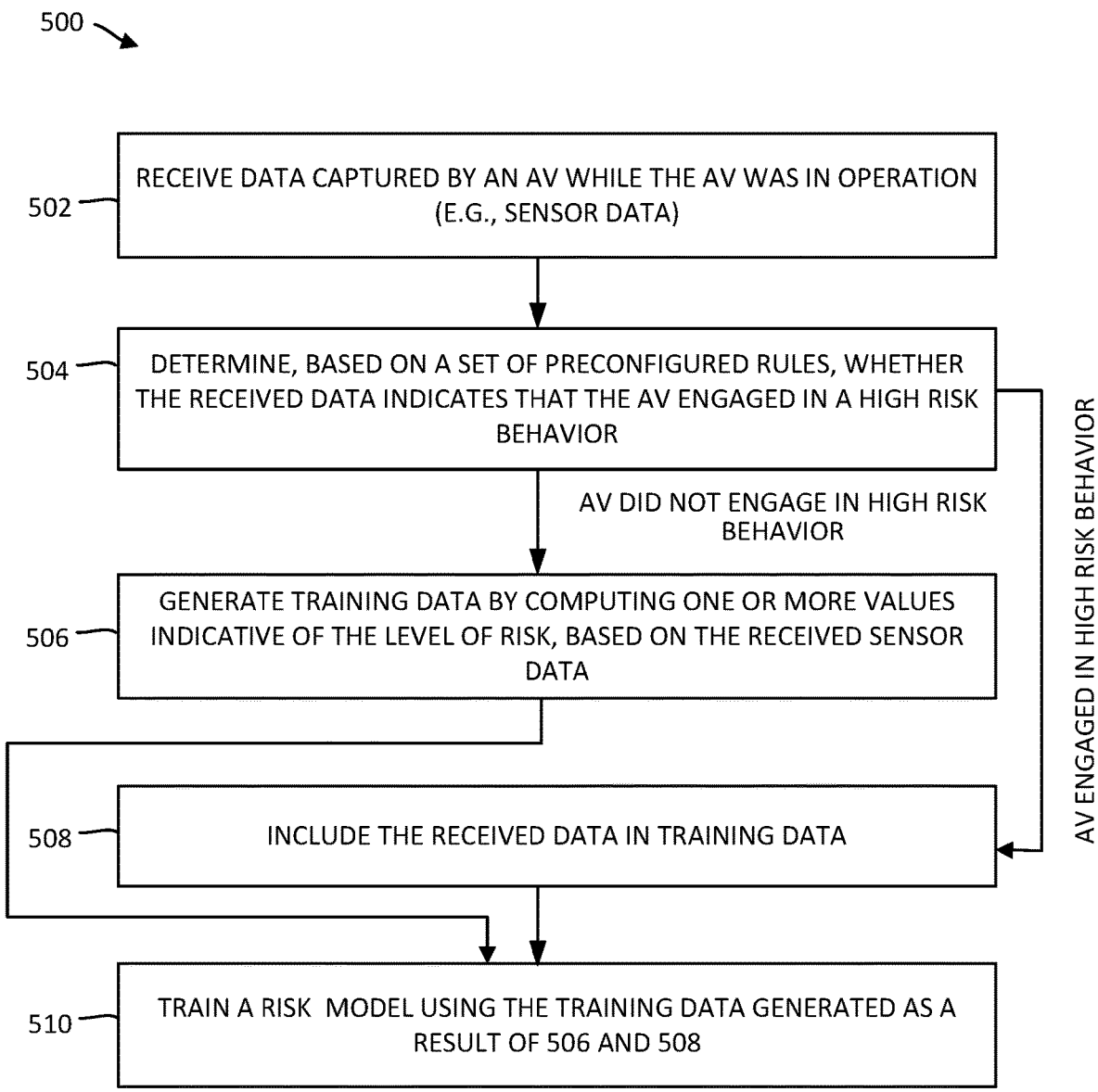
FIG. 5 is a flow chart illustrating a process for obtaining training data for training a risk model used for determining an insurance premium according to certain embodiments.

FIG. 5 is a flow chart illustrating a process for obtaining training data for training a risk model used for determining an insurance premium according to certain embodiments. Training data obtained according to the method of FIG. 5 can also be used for training a pricing model in accordance with certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 5 may be performed by an entity (e.g., one of the data sources 160) responsible for collecting data to be used for training a model in an insurance premium computation system (e.g., a risk model or pricing model within IPCS 132).

At 502, data captured by an AV while the AV was in operation is received. The data received in 502 can include data from one or more sensors of the AV (e.g., camera, LIDAR, radar) and other types data such as an error log from an on-board diagnostics system. The data received in 502 can be live data that is transmitted from the AV while the AV is operating. Alternatively or additionally, at least some of the data received in 502 can be obtained at a later time, e.g., after the AV has returned to a garage or other storage location. Thus, the received data can include data for a single trip or multiple trips.

At 504, a determination is made, based on a set of preconfigured rules, as to whether the data received in 502 indicates that the AV engaged in a high-risk behavior. A high-risk behavior is any behavior by the AV (more specifically, an operation determined by the controller system/AV agent of the AV) that causes an incident. Examples of incidents (e.g., collisions, injury to a person, violation of traffic laws, disengagements) were described above in connection with the embodiment of FIG. 3. The determination in 504 can be performed for multiple time slots to output a separate result for each time slot. The granularity of the time slots may be configurable. For example, a time slot could correspond to a time period of half an hour, several minutes, a day, the entire length of a single trip, etc.

At 506, training data is generated by computing one or more values indicative of the level of risk. For example, a value computed in 506 can be a score from 0-1, where a score of 0 corresponds to no-risk behavior, a score of 1 corresponds to high-risk behavior, and a score between 0 and 1 indicates a moderate level of risk associated with the behavior. Each value computed in 506 is then associated with a corresponding portion of the data received in 502 (e.g., as a label for a set of attribute values).

The values computed in 506 can be considered a measure of incidence (the degree to which an incident was observed), and are computed for any portion of the data received in 502 that corresponds to a behavior that, according to the results of the determination in 504, was not high-risk. Over the course of several trips, the AV may have engaged in high-risk behavior during some, but not all of the trips. Similarly, over the course of a single trip, there may have been time slots during which the AV engaged in behavior that was not high-risk, and time slots where there was high-risk behavior. In a situation where there was no high-risk behavior, the data captured by the AV may nevertheless be of value in evaluating the level of risk associated with the AV's behavior. Thus, by computing values indicative of the level of risk, a richer set of training data is generated compared to generating training data exclusively based on data associated with high-risk behaviors.

At 508, any portion of the data received in 502 that, according to the results of the determination in 504, was high-risk is included as part of the training data. Inclusion of data associated with high-risk behavior ensures that the model to be trained has access to data that the model can use as a basis for learning to detect high-risk behavior from a set of attribute values received by the model as input subsequent to training.

At 510, a risk model (e.g., one of the risk models 312, 314, or 316 in FIG. 3) is trained using the training data generated as a result of the processing in 506 and 508. In addition to this training data, the training of the risk model in 510 can include the use of simulation data obtained through running the AV in a simulation environment.

Figure 6:
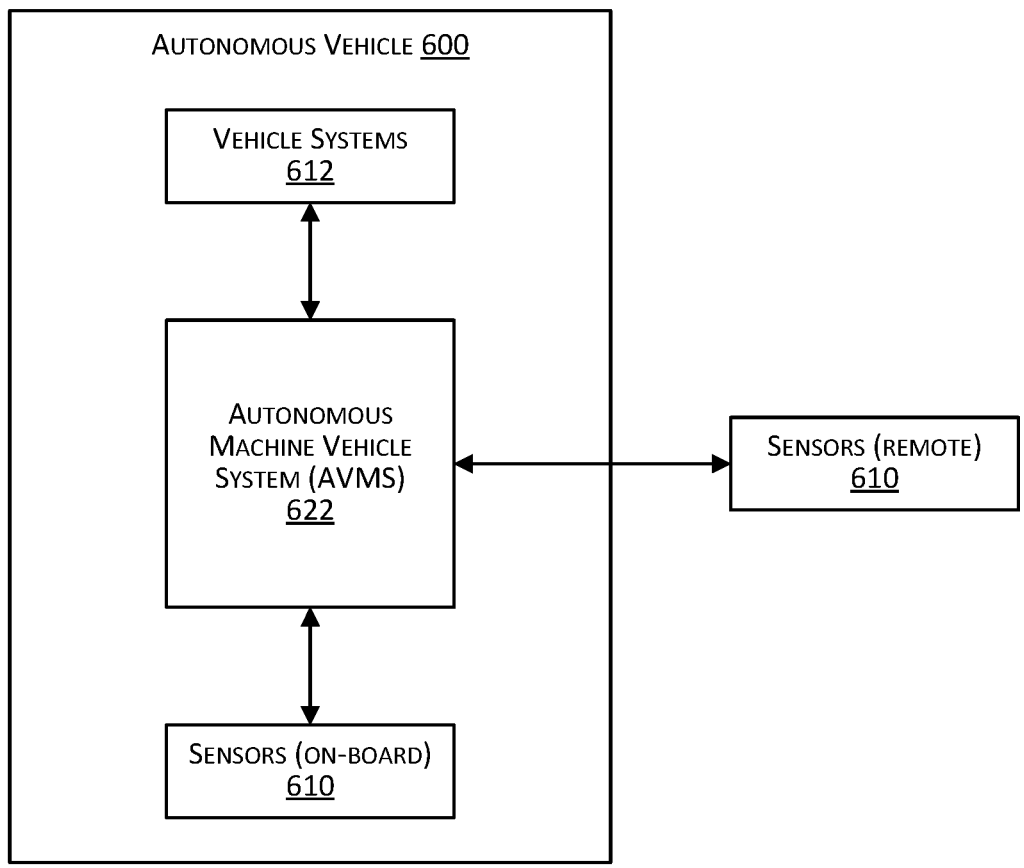
FIG. 6 is a simplified block diagram of an autonomous vehicle incorporating a controller system (referred to herein as an autonomous vehicle management system (AVMS)) according to certain embodiments.

FIG. 6 is a simplified block diagram of an AV 600 incorporating a controller system (referred to herein as an autonomous vehicle management system (AVMS) 622) according to certain embodiments.

Autonomous vehicle 600 can be of various different types. For example, autonomous vehicle 600 can be a car or mobile machine that can be used to transport people and/or cargo. Since the environment of autonomous vehicle 600 can include other vehicles, including other autonomous vehicles, for purposes of clarity, in order to differentiate autonomous vehicle 600 from other vehicles in its environment, autonomous vehicle 600 is also sometimes referred to as the ego vehicle.

As depicted in FIG. 6, in addition to autonomous vehicle management system 622, autonomous vehicle 600 may include or be coupled to sensors 610, and vehicle systems 612. Autonomous vehicle management system 622 may be communicatively coupled with sensors 610 and vehicle systems 612 via wired or wireless links. One or more different communication protocols may be used for facilitating communications between autonomous vehicle management system 622 and sensors 610 and between autonomous vehicle management system 622 and vehicle systems 612.

Vehicle systems 612 can include various electro-mechanical systems, components, linkages, etc. that enable autonomous vehicle 600 to perform its intended functions such as traveling or navigating along a particular path or course. Vehicle systems 612 may include for example, a steering system, a throttle system, a braking system, a propulsion system, etc. for driving the autonomous vehicle, electrical systems, auxiliary systems (e.g., systems for outputting information to a driver or passenger of autonomous vehicle 600), and the like. Vehicle systems 612 can be used to set the path and speed of autonomous vehicle 600.

Sensors 610 may be located on or in autonomous vehicle 600 ("onboard sensors") or may even be located remotely ("remote sensors") from autonomous vehicle 600. Autonomous vehicle management system 622 may be communicatively coupled with remote sensors via wireless links using a wireless communication protocol. Sensors 610 can obtain environmental information for autonomous vehicle 600. This sensor data can then be fed to autonomous vehicle management system 622. Sensors 610 can include, for example, one or more of the following types of sensors and, for each type of sensor, one or more instances of that sensor type: LIDAR sensors, radar sensors, ultrasonic sensors, cameras (different kinds of cameras with different sensing capabilities may be used), Global Positioning System (GPS) and Inertial Measurement Unit (IMU) sensors, Vehicle-to-everything (V2X) sensors, audio sensors, and the like. Sensors 610 can obtain (e.g., sense, capture) environmental information for autonomous vehicle 600 and communicate the sensed or captured sensor data to autonomous vehicle management system 622 for processing.

Examples of radar sensors (i.e. long range radar, short range radar, imaging radar etc.) may include sensors that are used to detect objects in the environment of autonomous vehicle 600 and to determine the velocities of the detected objects. Examples of LIDAR sensors include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving parts of a traffic system. For example, autonomous vehicle 600 may use a V2X sensor for passing and/or receiving information from a vehicle to another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

Autonomous vehicle management system 622 (also referred to as a controller system) is configured to process data describing the state of autonomous vehicle 600 and the state of the autonomous vehicle's environment, and based upon the processing, control one or more autonomous functions or operations of autonomous vehicle 600. For example, autonomous vehicle management system 622 may issue instructions/commands to vehicle systems 612 to programmatically and autonomously control various aspects of the autonomous vehicle's motion such as the propulsion, braking, steering or navigation, and auxiliary behavior (e.g., turning lights on) functionality of autonomous vehicle 600. Autonomous vehicle management system 622 implements the control and planning algorithms that enable autonomous vehicle 600 to perform one or more operations autonomously.

Autonomous vehicle management system 622 may be implemented using software only, hardware only, or combinations thereof. The software may be stored on a non-transitory computer readable medium (e.g., on a memory device) and may be executed by one or more processors (e.g., by computer systems) to perform its functions. In the embodiment depicted in FIG. 6, autonomous vehicle management system 622 is shown as being in or on autonomous vehicle 600. This is however not intended to be limiting. In alternative embodiments, autonomous vehicle management system 622 can also be remote from autonomous vehicle 600.

Autonomous vehicle management system 622 receives sensor data from sensors 610 on a periodic or on-demand basis. Autonomous vehicle management system 622 uses the sensor data received from sensors 610 to perceive the autonomous vehicle's surroundings and environment. Autonomous vehicle management system 622 uses the sensor data received from sensors 610 to generate and keep updated a digital model that encapsulates information about the state of autonomous vehicle and of the space and environment surrounding autonomous vehicle 600. This digital model may be referred to as an internal map, which encapsulates the current state of autonomous vehicle 600 and its environment. The internal map along with other information is then used by autonomous vehicle management system 622 to make decisions regarding actions (e.g., navigation, braking, acceleration, etc.) to be performed by autonomous vehicle 600. Autonomous vehicle management system 622 may send instructions or commands to vehicle systems 612 to cause the actions be performed by the systems of vehicles systems 612.

Figure 7:
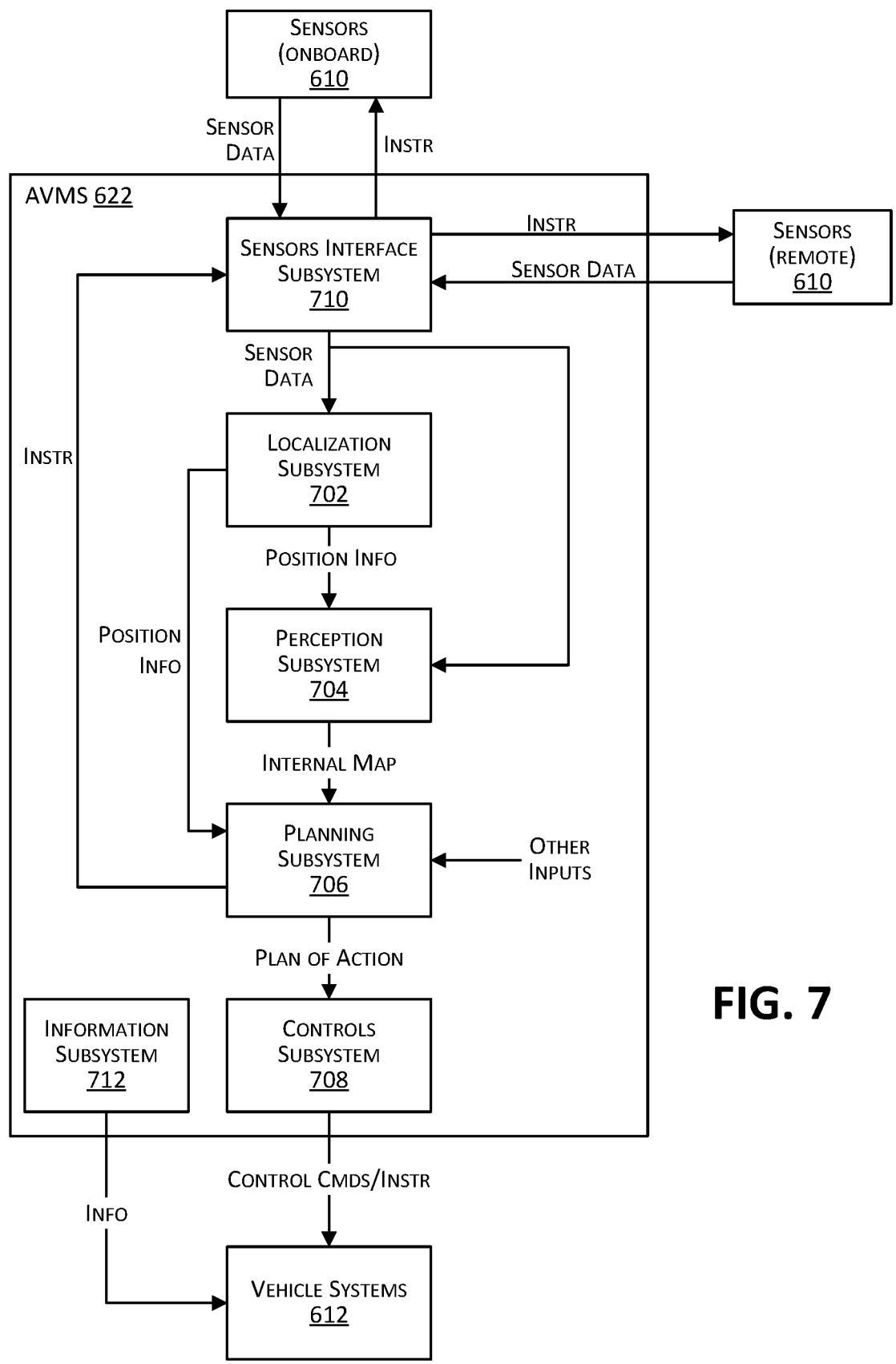
FIG. 7 is a simplified block diagram depicting subsystems of an autonomous vehicle management system according to certain embodiments.

FIG. 7 is a simplified block diagram depicting subsystems of autonomous vehicle management system 622 according to certain embodiments. Autonomous vehicle management system 622 may comprise multiple systems or subsystems communicatively coupled to each other via one or more communication channels. In the embodiment depicted in FIG. 7, the subsystems include a sensors interface subsystem 710, a localization subsystem 702, a perception subsystem 704, a planning subsystem 706, a controls subsystem 708, and an information subsystem 712.

Autonomous vehicle management system 622 embodiment depicted in FIG. 7 is merely an example and is not intended to unduly limit the scope of claimed embodiments. One of ordinary skill in the art would recognize many possible variations, alternatives, and modifications. For example, in some implementations, autonomous vehicle management system 622 may have more or fewer subsystems or components than those shown in FIG. 7, may combine two or more subsystems, or may have a different configuration or arrangement of subsystems. The subsystems may be implemented using software only, hardware only, or combinations thereof. In the embodiment depicted in FIG. 7, autonomous vehicle management system 622 and all its subsystems are shown as being in or on autonomous vehicle 600. This is however not intended to be limiting. In alternative embodiments, all the subsystems of autonomous vehicle management system 622 or certain subsystems of autonomous vehicle management system 622 can also be remote from autonomous vehicle 600.

Sensors interface subsystem 710 provides an interface that enables communications between sensors 610 (including on-board sensors and remote sensors) and autonomous vehicle management system 622. Sensors interface subsystem 710 may receive sensor data from sensors 610 and provide the data to one or more other subsystems of autonomous vehicle management system 622. For example, as depicted in FIG. 7, sensor data may be provided to localization subsystem 702 and perception subsystem 704 for further processing. The sensor data collected by the various sensors 610 enables autonomous vehicle management system 622 to construct a view or picture of autonomous vehicle 600 and its surrounding environment.

In certain embodiments, autonomous vehicle management system 622 enables one or more subsystems of autonomous vehicle management system 622 to send instructions or commands to one or more sensors 610 to control the operations of the one or more sensors. For example, instructions may be sent to a particular sensor to change the behavior of the particular sensor. For example, instructions may be sent to a sensor to change the information sensed or collected by the sensor and/or to change the sensor data communicated from the sensor to autonomous vehicle management system 622. Using these instructions, autonomous vehicle management system 622 can dynamically control the sensor data that is communicated from sensors 610 to autonomous vehicle management system 622. Further details on this are provided below in the context of functions performed by planning subsystem 706.

Localization subsystem 702 is configured to receive sensor data from sensors 610, and based upon the sensor data, identify the location of autonomous vehicle 600 in its surrounding environment (vehicle localization). Localization subsystem 702 provides current, local position information of the ego vehicle with respect to its environment (example: mine). The position of the ego vehicle 600 may be determined with respect to a pre-defined map that is generated by perception subsystem 704. In certain embodiments, localization subsystem 702 is configured to broadcast the ego vehicle's position information to other systems or subsystems of autonomous vehicle 600. The other systems or subsystems may then use the position information as needed for their own processing.

Localization subsystem 702 may implement various functions such as internal map management, map matching, visual odometry, dead reckoning, location history management, and the like. For example, assume that autonomous vehicle 600 is driving in a city. Localization subsystem 702 may receive as input a map of the city, the map including information on a route (e.g., streets along the route). Localization subsystem 702 may determine the position of the ego vehicle along the route. Localization subsystem 702 may do so by utilizing multiple inputs it receives from sensors and maps of the environment. Localization subsystem 702 may use GPS sensor data to determine the global positioning of the ego vehicle. Localization subsystem 702 may receive the GPS sensor data and translate it to a more useful form that is usable by one or more other subsystems of autonomous vehicle management system 622. For example, information, localization subsystem 702 may identify where the ego vehicle is positioned with respect to a map of the environment, such as a city map (also referred to as map management).

Localization subsystem 702 may also be configured to perform map matching, where what localization subsystem 702 perceives is matched with the information that it has. Map matching can match recorded geographic coordinates to a logical model of the real world, (e.g., using a Geographic Information System (GPS), etc.). In one example, a map matching algorithm can obtain a recorded, serial location points (e.g. from GPS) and relate them to edges in an existing street graph (e.g., as a network). This can be in a sorted list representing the travel of an autonomous vehicle. As part of map matching, localization subsystem 702 is tracking the ego vehicle in its environment and deducing its position based on what localization subsystem 702 sees relative to a map, such as a real world map.

Localization subsystem 702 is also configured to perform visual odometry, which involves determining the orientation and position of the ego vehicle based upon sensor data, such as by analyzing images captured by one or more cameras.

Localization subsystem 702 may also perform dead reckoning processing. Dead reckoning is the process of calculating one's current position by using a previously determined position, or fix, and advancing that position based upon known or estimated speeds over elapsed time and course. This may involve calculating the ego vehicle's position by estimating the direction and distance traveled. For example, autonomous vehicle management system 622 receives and knows certain information about autonomous vehicle 600 such as it wheel speed, steering angle, where autonomous vehicle 600 was a second ago, and the like. Based on the past position information and in combination with speed/steering angle etc., localization subsystem 702 can determine the vehicle's next location or current location. This provides local understanding of the ego vehicle's position as it moves on its path. A path can be a road, highway, rail system, runway, boat route, bike path, etc., according to various embodiments.

Localization subsystem 702 may also perform local history management tracking, where historical information about the ego vehicle's path is analyzed and compared to the current path. For example, if autonomous vehicle 600 drives around a certain path many number of times, this information can be compared and analyzed by localization subsystem 702.

Localization subsystem 702 may also implement a consistency module that is configured to perform rationality checks, deficiency checks, normalize sensor data, etc. For example, localization subsystem 702 may receive information from different sources of information regarding the ego vehicle's position, location, etc. A rationality check may be used to do a validity check to make sure information from various sensors is consistent and robust. This helps reduce erroneous results. The rationality check can include tests to evaluate whether a sensor data value and/or the result of a calculation can possibly be true. The sensor data received from sensors 610 can also be normalized and the normalized sensor data then provided to localization subsystem 702. Localization subsystem 702 can then utilize the normalized sensor data to generate and/or update the consistent internal map of the real-time (e.g. assuming networking and processing latencies, et.) environment of the autonomous vehicle.

Perception subsystem 704, periodically or on-demand, receives sensor data from sensors 610 and builds and maintains a consistent internal map based upon the received information. Perception subsystem 704 may also receive inputs from other sources, such as from localization subsystem 702, and use the received inputs to build and maintain the internal map. The internal map generated by perception subsystem 704 contains all the information including the ego vehicle's information, state of the ego vehicle and its environment, information about objects in the ego vehicle's environment (e.g., information regarding dynamic and static objects around ego vehicle). Consistent internal map can be a localized map of sensed entities/objects in the autonomous vehicle's environment, for example, around the autonomous vehicle. In certain embodiments, these sensed entities/objects are mapped in three dimensions (3D). In certain embodiments, perception subsystem 704 receives position information from localization subsystem 702 and incorporates the position information in the internal map. The internal map can be maintained even in the event that a sensor falls offline.

Rationality checks and normalization may be performed on the sensor data received by perception subsystem 704. These checks can include tests to evaluate whether a sensor data value and/or the result of a calculation can possibly be true. The sensor data received from sensors 610 can also be normalized and the normalized sensor data then provided to perception subsystem 704. Perception subsystem 704 can then utilize the normalized sensor data to generate and/or update the consistent internal map of the real-time environment of the autonomous vehicle.

Perception subsystem 704 may use various different algorithms and techniques to perform its functions, including artificial intelligence (AI) and machine learning based techniques. For example, perception subsystem 704 may use a convolutional neural network (CNN) to perform object detection and object classification based upon the sensor data. During a training phase, the CNN may be trained using labeled training data comprising sample images of a vehicle's environment and corresponding ground truth classifications. Labeled data generally includes a group of samples that have been tagged with one or more labels, where the labels represent known results (e.g., ground truth classification, etc.) for the training input samples. Labeling can also be used to take a set of unlabeled data and augment each piece of that unlabeled data with meaningful tags that are informative. A CNN model or other AI/machine learning model built based upon training may then be used in real time to identify and classify objects in the environment of autonomous vehicle 600 based upon new sensor data received from sensors 610.

Planning subsystem 706 is configured to generate a plan of action for autonomous vehicle 600. The plan may comprise one or more planned actions or operations to be performed by autonomous vehicle 600. For example, the plan may comprise information identifying a trajectory or path to be traversed by autonomous vehicle 600. A path can be a road, highway, rail system, runway, boat route, bike path, etc., according to various embodiments. For example, the trajectory information may indicate how the vehicle should move from point A to point B with a list of points between point A point B marking a trajectory for the vehicle to follow from point A to point B. As another example, the plan generated by planning subsystem 706 may include planned actions with respect to accessories of autonomous vehicle 600, such as turning indicators or lights on or off, producing one or more sounds (e.g., alarms), and the like. After a plan of action has been generated, planning subsystem 706 may communicate the plan of action to controls subsystem 708, which may then control one or more systems of vehicle systems 612 to cause the planned actions in the plan of action to be performed in a safe manner by autonomous vehicle 600.

In addition to the internal map generated by perception subsystem 704, planning subsystem 706 may also receive various other inputs that it uses in generating the plan of action for autonomous vehicle 600. These inputs may include, without limitation: (a) Position or localization information received from localization subsystem 702. (b) Information identifying one or more goals of autonomous vehicle 600 (e.g., information may be received identifying a final goal of autonomous vehicle 600 to make a right turn). The goal may be set by an end user or operator of the autonomous vehicle or machine. For an automotive example, the user may set a high level to drive from the current location of autonomous vehicle 600 to a particular final destination. Autonomous vehicle 600 may determine a GPS route plan based upon the current and final destination locations and with a goal to autonomously drive from the current location to the final destination according to the GPS route plan. In general, one or more different goals may be provided. Examples of categories of goals (some of which may overlap) include, without limitation: goals related to performing an autonomous operation by the autonomous vehicle (e.g., autonomous driving or navigation along a path), goals related to maneuvering the vehicle, goals related to interaction of the vehicle with various actors, objects, etc. in the vehicle's environment, goals related to the general operations of the vehicles, and the like. Examples of goals: changing lanes, driving from one location to another location, driving to a destination as fast as possible, making a turn, performing a series of steps in a sequence, and others. (c) High level route information regarding the path or route to be taken by autonomous vehicle 600. This may be provided directly or indirectly by an end user or operator of the autonomous vehicle. (d) Information identifying safety considerations. These may also be provided to the autonomous vehicle by an end user/operator, etc. using APIs provided by autonomous vehicle 600 or via metadata configured for autonomous vehicle 600. Examples of these considerations include, without limitation: always stay within the lane, maintain certain distance from any object at all time, a bus is not to make more than a 30 degree turn, etc. (e) Information about how a particular operation was performed in the past. For example, for a particular autonomous vehicle, this could be the past history of how that particular autonomous vehicle performed the operation in the past, how a different autonomous vehicle performed the operation in the past, how the operation was manually performed using a vehicle in the past (e.g., how a driver/operator performed the operation in the past with the vehicle operating under the driver/operator's control). (f) Other inputs.

Based upon the one or more inputs, planning subsystem 706 generates a plan of action for autonomous vehicle 600. Planning subsystem 706 may update the plan on a periodic basis as the environment of autonomous vehicle 600 changes, as the goals to be performed by autonomous vehicle 600 change, or in general, responsive to changes in any of the inputs to planning subsystem 706.

As part of generating and updating the plan of action, planning subsystem 706 makes various decisions regarding which actions to include in the plan in order to achieve a particular goal in a safe manner. Processing performed by planning subsystem 706 as part of making these decisions may include behavior planning, global planning, path planning, fail-safe path, path history tracking, etc.

Planning subsystem 706 may use various AI-based machine-learning algorithms to generate and update the plan of action in order to achieve the goal of performing a function or operation (e.g., autonomous driving or navigation, digging of an area) to be performed by autonomous vehicle 600 in a safe manner. For example, in certain embodiments, planning subsystem 706 may use a model trained using reinforcement learning (RL) for generating and updating the plan of action. Autonomous vehicle management system 622 may use an RL model to select actions to be performed for controlling an autonomous operation of autonomous vehicle 600. The RL model may be periodically updated to increase its coverage and accuracy. Reinforcement learning (RL) is an area of machine learning inspired by behaviorist psychology, concerned with how agents ought to take actions in an environment so as to maximize some notion of cumulative reward.

In certain embodiments, in addition to generating a plan of action, planning subsystem 706 is capable of dynamically controlling the behavior of sensors 610. For example, planning subsystem 706 can send instructions or commands to a particular sensor from sensors 610 to dynamically control the sensor data that is captured by the particular sensor and/or control the sensor data that is communicated from the sensor to perception subsystem 704 (or to other subsystems of autonomous vehicle management system 622, such as to localization subsystem 702). Since the internal map built by perception subsystem 704 is based upon the sensor data received by perception subsystem 704 from the sensors, by being able to dynamically control the sensor data received from the sensors, the information included in and/or used by perception subsystem 704 to build and maintain the internal map can also be dynamically controlled by planning subsystem 706. Planning subsystem 706 can dynamically and on-demand direct sensors 610 to obtain specific types of information or behave in specified manners, for example, to provide additional sensor data to update the consistent internal map. For example, planning subsystem 706 can command a LIDAR sensor to narrow its range of sensing from a three-hundred and sixty-degree (360°) view to a narrower range that includes a specific object to be sensed and/or tracked in greater detail by the LIDAR system. In this way, the consistent internal map is updated based on feedback from and under the control of planning subsystem 706.

Autonomous vehicle management system 622 provides an infrastructure that enables planning subsystem 706 (or other subsystems of autonomous vehicle management system 622) to send one or more instructions or commands to one or more sensors to control the behavior of those one or more sensors. In the embodiment depicted in FIG. 7, sensors interface subsystem 710 provides an interface for interacting with sensors 610. In the outbound direction (from autonomous vehicle management system 622 to the sensors direction), planning subsystem 706 can send an instruction or command to sensors interface subsystem 710. Sensors interface subsystem 710 is then configured to communicate the received instruction to the intended destination sensor. In the inbound direction (from a sensor to autonomous vehicle management system 622), sensors interface subsystem 710 may receive sensor data from a sensor in response to the instruction sent from planning subsystem 706. Sensors interface subsystem 710 may then communicate the received sensor data to planning subsystem 706 (or to the appropriate subsystem of autonomous vehicle management system 622 which originated the instruction).

Sensors interface subsystem 710 may be capable of communicating with different sensors using one or more different communication protocols. In certain embodiments, in the outbound direction, for an instruction or command received from planning subsystem 706 (or from any other subsystem of autonomous vehicle management system 622) and to be sent to a particular sensor, sensors interface subsystem 710 may translate the instruction to a format that is understandable by and appropriate for communicating with that particular sensor and then use a particular communication protocol that is applicable for that particular sensor.

In certain embodiments, autonomous vehicle management system 622 may have access to information identifying sensors 610 and their capabilities. The subsystems of autonomous vehicle management system 622 may then access and use this stored information to determine the possible capabilities and behaviors of a sensor and to send instructions to that sensor to change its behavior. In certain embodiments, a sensor has to be registered with autonomous vehicle management system 622 before communications that enables between the sensor and autonomous vehicle management system 622. As part of the registration process, for a sensor being registered, information related to the sensor may be provided. This information may include information identifying the sensor, the sensor's sensing capabilities and behaviors, communication protocol(s) usable by the sensor, and other information related to the sensor. Autonomous vehicle management system 622 may then use this information to communicate with and control the behavior of the sensor.

As indicated above, planning subsystem 706 may send instructions to a sensor to control and change the sensor's behavior. Changes in a sensor's behavior can include changing the sensor data that is communicated from the sensor to autonomous vehicle management system 622 (e.g. the sensor data communicated from the sensor to perception subsystem 704, or other subsystems of autonomous vehicle management system 622), changing the data that is collected or sensed by the sensor, or combinations thereof. For example, changing the sensor data that is communicated from the sensor to autonomous vehicle management system 622 can include communicating more or less data than what was communicated from the sensor to autonomous vehicle management system 622 prior to receiving the instruction, and/or changing the type of sensor data that is communicated from the sensor to autonomous vehicle management system 622. In some instances, the data sensed or collected by the sensor may remain the same but the sensor data communicated from the sensor to autonomous vehicle management system 622 may change. In other instances, the data sensed or collected by the sensor may itself be changed in response to an instruction received from autonomous vehicle management system 622. Planning subsystem 706 may also be able to turn a sensor on or off by sending appropriate instructions to the sensor.

For example, planning subsystem 706 may receive inputs including a current internal map generated by perception subsystem 704, position information from localization subsystem 702, and a goal that autonomous vehicle 600 is to make a turn in a certain amount of time (e.g., a right turn in the next 5 seconds). As part of deciding what is the best set of actions to be taken by autonomous vehicle 600 to achieve the goal in a safe manner, planning subsystem 706 may determine that it needs particular sensor data (e.g., additional images) showing the environment on the right side of autonomous vehicle 600. Planning subsystem 706 may then determine the one or more sensors (e.g., cameras) that are capable of providing the particular sensor data (e.g., images of the environment on the right side of autonomous vehicle 600). Planning subsystem 706 may then send instructions to these one or more sensors to cause them to change their behavior such that the one or more sensors capture and communicate the particular sensor data to autonomous vehicle management system 622 (e.g., to perception subsystem 704). Perception subsystem 704 may use this specific sensor data to update the internal map. The updated internal map may then be used by planning subsystem 706 to make decisions regarding the appropriate actions to be included in the plan of action for autonomous vehicle 600. After the right turn has been successfully made by autonomous vehicle 600, planning subsystem 706 may send another instruction instructing the same camera(s) to go back to communicating a different, possibly reduced, level of sensor data to autonomous vehicle management system 622. In this manner, the sensor data that is used to build the internal map can be dynamically changed.

Examples of changes in a sensor's behavior caused by an instruction received by the sensor from autonomous vehicle management system 622 may include, without limitation:

Cause a sensor to reduce, or even shut off, sensor data that is communicated from the sensor to autonomous vehicle management system 622. This may be done, for example, to reduce the high volume of sensor data received by autonomous vehicle management system 622. Using the same example from above, where planning subsystem 706 receives an input indicating that a goal of the autonomous vehicle 600 is to make a right turn, planning subsystem 706 may decide that it requires reduced sensor data with respect to the left environment of autonomous vehicle 600. Planning subsystem 706 may then determine the one or more sensors (e.g., cameras) that are responsible for communicating the sensor data that is to be reduced. Planning subsystem 706 may then send instructions to these one or more sensors to cause them to change their behavior such that the amount of sensor data communicated from these sensors to autonomous vehicle management system 622 (e.g., to perception subsystem 704) is reduced. As an example, the instructions sent from the planning subsystem 706 may do one or more of the following:

Cause a sensor to change its field of view. For example, causing a camera or a LIDAR sensor to zoom in to a narrow location.

Cause a sensor to only send partial information. For example, the sensor may send less than all the information captured by the sensor.

Cause a sensor to send information faster or slower than before or than a regular rate.

Cause a sensor to turn on.

Cause a sensor to capture and/or send information to autonomous vehicle management system 622 at a different resolution or granularity than before.

Figure 8:
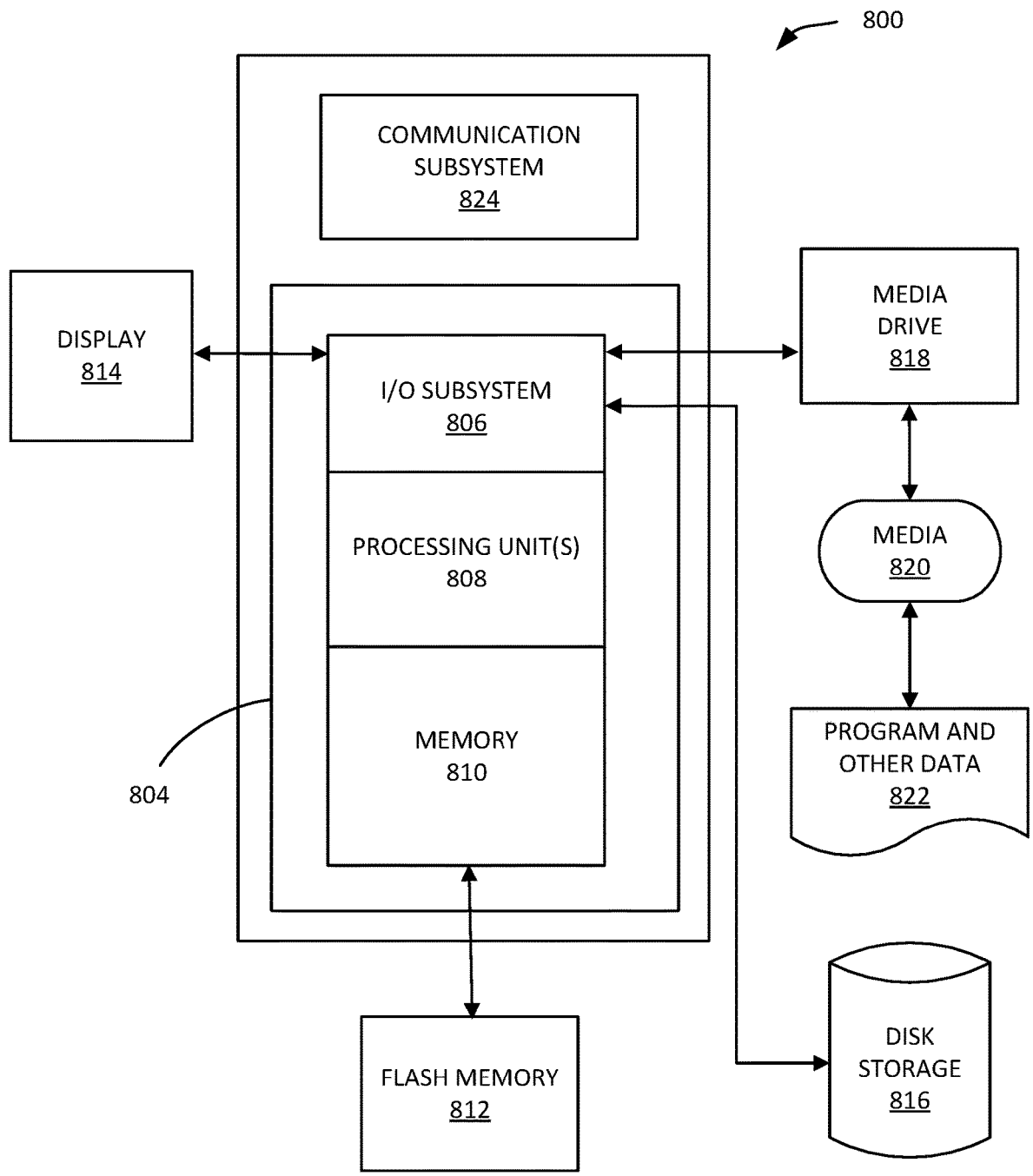
FIG. 8 is a simplified block diagram of an exemplary computing system that can be used to implement one or more of the systems and subsystems described in this disclosure and/or to perform any one of the processes or methods described herein.

FIG. 8 depicts a simplified block diagram of an exemplary computing system 800 that can be used to implement one or more of the systems and subsystems described in this disclosure and/or to perform any one of the processes or methods described herein. For example, in embodiments where an autonomous vehicle management system is implemented in software, the software may be executed by a computing system such as computing system 800 depicted in FIG. 8. Computing system 800 may include, for example, a processor, memory, storage, and I/O devices (e.g., a monitor, a keyboard, a disk drive, an Internet connection, etc.). In some instances, computing system 800 may also include other components, circuitry, or other specialized hardware for carrying out specialized functions. In some operational settings, computing system 800 may be configured as a system that includes one or more units, each of which is configured to carry out some aspects of the processes either in software only, hardware only, or some combination thereof. Computing system 800 can be configured to include additional systems in order to fulfill various functionalities.

As depicted in embodiment in FIG. 8, computing system 800 includes one or more processing units 808, a set of memories (including system memory 810, computer-readable media 820, and disk storage 816), and an I/O subsystem 806. These components may be communicatively coupled to each other via a bus subsystem that provides a mechanism for the various systems and subsystems of computing system 800 to communicate with each other as intended. The bus subsystem can be any of several types of bus structures including a memory bus or memory controller, a peripheral bus, a local bus using any of a variety of bus architectures, and the like. In some embodiments, components 806, 808 and 810 may be located on a motherboard 804.

Processing units 808 may include one or more processors. The processors may be single or multicore processors. Processing units 808 can also be implemented using customized circuits, such as application specific integrated circuits (ASICs), or field programmable gate arrays (FPGAs). The processors are configured to execute instructions (e.g., programs, code, etc.) stored in the various memories, such as in system memory 810, on computer readable storage media 820, or on disk 816. The programs or processes may be executed sequentially or in parallel. In certain embodiments, computing system 800 may provide a virtualized computing environment executing one or more virtual machines. In such embodiments, one or more processors or cores of processors may be allocated to each virtual machine. In some embodiments, a processing unit 808 may include special purpose co-processors such as graphics processors (GPUs), digital signal processors (DSPs), or the like.

The set of memories can include one or more non-transitory memory devices, including volatile and non-volatile memory devices. Software (programs, code modules, instructions) that, when executed by one or more processors of the processing unit(s) 808 provide the functionality described herein, may be stored in one or more of the memories. Flash memory 812 may also be included in certain embodiments. System memory 810 may include a number of memories including a volatile main random access memory (RAM) (e.g., static random access memory (SRAM), dynamic random access memory (DRAM), and the like) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by the processing unit(s) 808.

Executable code, program instructions, applications, and program data may be loaded into system memory 810 and executed by one or more processors of processing unit(s) 808. One or more operating systems may also be loaded into system memory 810. Examples of operating systems include, without limitation, different versions of Microsoft Windows®, Apple Macintosh®, Linux operating systems, and/or mobile operating systems such as iOS, Windows® Phone, Android® OS, BlackBerry® OS, Palm® OS operating systems, and others.

In certain embodiments, programming modules and instructions, data structures, and other data (collectively 822) that are used to provide the functionality of some embodiments may be stored on computer-readable media 820. A media drive 818 connected to computing system 800 may be provided for reading information from and/or writing information to computer-readable media 820. Computer-readable media 820 may include non-volatile memory such as a magnetic disk drive, an optical disk drive such as a CD ROM, DVD, a Blu-Ray® disk, or other optical media, Zip® drives, various types of memory cards and drives (e.g., a USB flash drive, SD cards), DVD disks, digital video tape, solid-state drives (SSD), and the like.

I/O subsystem 806 may include devices and mechanisms for inputting information to computing system 800 and/or for outputting information from or via computing system 800. In general, use of the term input device is intended to include all possible types of devices and mechanisms for inputting information to computing system 800. Input mechanisms may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, cameras, digital camcorders, portable media players, webcams, image scanners, fingerprint scanners, barcode readers, and the like. In general, use of the term output device is intended to include all possible types of devices and mechanisms for outputting information from computing system 800 to a user or other computer. Such output devices may include one or more types of displays, indicator lights, or non-visual displays such as audio output devices, printers, speakers, headphones, voice output devices, etc. I/O subsystem 806 may also include interfaces to input and/or output devices external to the I/O subsystem 806, such as a display 814.

Computing system 800 may include a communications subsystem 824 that provides an interface for computing system 800 to communicate (e.g., receive data, send data) with other computer systems and networks. Communication subsystem 824 may support both wired and/or wireless communication protocols. For example, communication subsystem 824 may enable computing system 800 to be communicatively coupled with remote sensors, with a network such as the Internet, and the like. Various different communication protocols and formats may be used for the communications such Wi-Fi, Bluetooth® (and/or other standards for exchanging data over short distances includes those using short-wavelength radio transmissions), USB, Ethernet, cellular, an ultrasonic local area communication protocol, etc.

Computing system 800 can be one of various types, including a mobile device (e.g., a cellphone, a tablet, a PDA, etc.), a personal computer, a workstation, or any other data processing system. Due to the ever-changing nature of computers and networks, the description of computer system 800 depicted in FIG. 8 is intended only as a specific example. Many other configurations having more or fewer components than the system depicted in FIG. 8 are possible.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML). It is noted that JavaScript has been used as an example in several embodiments. However, in other embodiments, another scripting language and/or JavaScript variants can be utilized as well.

The described features, structures, or characteristics of described in this disclosure may be combined in any suitable manner in one or more embodiments. In the description herein, numerous specific details are provided, such as examples of programming, software modules, user selections, network transactions, database queries, database structures, hardware modules, hardware circuits, hardware chips, etc., to provide a thorough understanding of various embodiments. One skilled in the relevant art will recognize, however, that the features may be practiced without one or more of the specific details, or with other methods, components, materials, and so forth. In other instances, well-known structures, materials, or operations are not shown or described in detail to avoid obscuring novel aspects.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flow charts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a computer system, a request to provide an autonomous vehicle (AV) ride being booked by a user, wherein the request includes information identifying a start point and an end point for the AV ride, and information identifying an AV to be used for the ride;
   determining, by the computer system, at least one route from the start point to the end point, the at least one route including a first route;
   accessing, by the computer system, route data including attributes of the first route;
   accessing, by the computer system, vehicle data including attributes of the AV, wherein at least some of the attributes included in the route data or the vehicle data are determined at a time associated with the AV ride;
   generating, by the computer system and using a first pre-trained risk model, a first risk value for the first route, wherein the first pre-trained risk model predicts the first risk value based on the route data, and wherein the first risk value represents a likelihood, given the route data, of occurrence of an incident during the AV ride, wherein an incident is an unsafe condition or disengagement of autonomous control, wherein generating the first risk value includes calculating a pickup and drop-off complexity index (PDCI) for the route, the PDCI based on attributes associated with the start point and attributes associated with the end point, wherein the PDCI represents a degree of difficulty in navigating around the start point and the end point, wherein the first risk value is based at least in part on the PDCI;
   generating, by the computer system and using a second pre-trained risk model, a second risk value for the AV, wherein the second pre-trained risk model predicts the second risk value based on the vehicle data, and wherein the second risk value represents a likelihood, given the vehicle data, of occurrence of an incident during the AV ride;
   generating, by the computer system and using a first pre-trained pricing model, a first loss value for the first route, wherein the first pre-trained pricing model predicts the first loss value based on the route data, and wherein the first loss value represents a loss associated with the route data;
   generating, by the computer system and using a second pre-trained pricing model, a second loss value for the AV, wherein the second pre-trained pricing model predicts the second loss value based on the vehicle data, and wherein the second loss value represents a loss associated with the vehicle data;
   selecting, by the computer system, a route for use during the AV ride from the at least one route based at least in part on the first risk value, the first loss value, the second risk value, and the second loss value; and
   communicating, by the computer system, the selected actual route to a controller system of the AV;
   obtaining, by the controller system, sensor data from a plurality of sensors, wherein the sensor data provides a representation of operation of the AV in an environment;
   generating, by the controller system, an internal map based on the sensor data, wherein the internal map comprises a three-dimensional representation of the environment around the AV, information on a current state of the AV, and information about the environment;
   generating, by the controller system, a plan of action for the AV that identifies a trajectory or path to be traversed by the AV based on the selected actual route and the internal map, wherein the plan comprises one or more planned actions or operations to be performed by the AV to travel from point A to point B along the trajectory or path; and
   controlling, by the controller system, one or more vehicle systems of the AV to cause the planned actions or operations to be performed by the AV while traveling from the point A to the point B along the trajectory or path.

2. The method of claim 1, further comprising:
   accessing, by the computer system, weather and road condition data, the weather and road condition data indicating weather expected during the AV ride and road conditions along the route;
   generating, by the computer system and using a third pre-trained risk model, a third risk value, wherein the third pre-trained risk model predicts the third risk value based on the weather and road condition data, and wherein the third risk value represents a likelihood, given the weather and road condition data, of occurrence of an incident during the AV ride; and
   generating, by the computer system and using a third pre-trained pricing model, a third loss value, wherein the third pre-trained pricing model predicts the third loss value based on the weather and road condition data, and wherein the third loss value represents a loss associated with the weather and road condition data; and wherein selecting the route for use during the AV ride is further based on the third risk value and the third loss value.

3. The method of claim 1, wherein selecting the route for use during the AV ride comprises (1) calculating an expected loss for the first route based on the first risk value and the first loss value, and (2) calculating an expected loss for the AV based on the second risk value and the second loss value.

4. The method of claim 1, wherein the attributes of the AV include attributes of a hardware or software configuration of the AV.

5. The method of claim 4, wherein the attributes of the AV include attributes relating to a configuration of one or more sensors of the AV.

6. The method of claim 1, wherein the at least some of the attributes determined at the time associated with the AV ride relate to a time window relative to the time associated with the AV ride.

7. The method of claim 6, wherein at least some of the attributes included in the route data or the vehicle data include historical data relating to a period of time earlier than the time window, and wherein the historical data is collected prior to receiving the request.

8. The method of claim 1, wherein the time associated with the AV ride is a time of booking the AV ride or a time of the AV ride.

9. The method of claim 1, wherein the route data includes a route complexity index (RCI), the method further comprising:
calculating, by the computer system, the RCI based on attributes associated with the first route, wherein the RCI represents a degree of difficulty in navigating along the first route, and wherein the first pre-trained risk model predicts the first risk value based on the RCI.

10. The method of claim 1, wherein the first pre-trained risk model or the second pre-trained risk model was trained using simulation data generated during a computer simulation of the AV's operation.

11. The method of claim 1, wherein the at least one route further includes a second route, the method further comprising:
generating, by the computer system and using the first pre-trained risk model, a third risk value for the second route, wherein the first pre-trained risk model predicts the third risk value based on attributes of the second route, and wherein the third risk value represents a likelihood, given the attributes of the second route, of occurrence of an incident during the AV ride; and
generating, by the computer system and using the first pre-trained pricing model, a third loss value for second route, wherein the first pre-trained pricing model predicts the third loss value based on the attributes of the second route, and wherein the third loss value represents a loss associated with the attributes of the second route,
wherein selecting, by the computer system, the route for use during the AV ride is based at least in part on a comparison of a first expected loss computed from the first risk value and the first loss value and a second expected loss computed from the third risk value and the third loss value.

12. The method of claim 11, wherein selecting the first route or the second route comprises selecting whichever route is associated with a lowest expected loss.

13. The method of claim 1, further comprising:
identifying, by the computer system, a plurality of data categories to use for generating the first risk value, the second risk value, the first loss value, and the second loss values, wherein the plurality of data categories includes a vehicle category and a route category; and
based on the identifying of the plurality of data categories, automatically selecting, by the computer system, the first pre-trained risk model, the second pre-trained risk model, the first pre-trained pricing model, and the second pre-trained pricing model from a plurality of pre-trained models.

14. A system comprising:
one or more processors; and
memory coupled to the one or more processors, the memory storing a plurality of instructions that, when executed by the one or more processors, causes the one or more processors to perform processing comprising:
receiving a request to provide an autonomous vehicle (AV) ride being booked by a user, wherein the request includes information identifying a start point and an end point for the AV ride, and information identifying an AV to be used for the ride;
determining a route from the start point to the end point;
accessing route data including attributes of the route;
accessing vehicle data including attributes of the AV, wherein at least some of the attributes included in the route data or the vehicle data are determined at a time associated with the AV ride;
generating, using a first pre-trained risk model, a first risk value for the route, wherein the first pre-trained risk model predicts the first risk value based on the route data, and wherein the first risk value represents a likelihood, given the route data, of occurrence of an incident during the AV ride, wherein an incident is an unsafe condition or disengagement of autonomous control,
wherein generating the first risk value includes calculating a pickup and drop-off complexity index (PDCI) for the route, the PDCI based on attributes associated with the start point and attributes associated with the end point, wherein the PDCI represents a degree of difficulty in navigating around the start point and the end point, wherein the first risk value is based at least in part on the PDCI;
generating, using a second pre-trained risk model, a second risk value for the AV, wherein the second pre-trained risk model predicts the second risk value based on the vehicle data, and wherein the second risk value represents a likelihood, given the vehicle data, of occurrence of an incident during the AV ride;
generating, using a first pre-trained pricing model, a first loss value for the route, wherein the first pre-trained pricing model predicts the first loss value based on the route data, and wherein the first loss value represents a loss associated with the route data;
generating, using a second pre-trained pricing model, a second loss value for the AV, wherein the second pre-trained pricing model predicts the second loss value based on the vehicle data, and wherein the second loss value represents a loss associated with the vehicle data;
selecting an actual route for use during the AV ride based at least in part on the first risk value, the first loss value, the second risk value, and the second loss value; and communicating the selected actual route to a controller system of the AV;
obtaining, by the controller system, sensor data from a plurality of sensors, wherein the sensor data provides a representation of operation of the AV in an environment;
generating, by the controller system, an internal map based on the sensor data, wherein the internal map comprises a three-dimensional representation of the environment around the AV, information on a current state of the AV, and information about the environment;
generating, by the controller system, a plan of action for the AV that identifies a trajectory or path to be traversed by the AV based on the selected actual route and the internal map, wherein the plan comprises one or more planned actions or operations to be performed by the AV to travel from point A to point B along the trajectory or path; and
controlling, by the controller system, one or more vehicle systems of the AV to cause the planned actions or operations to be performed by the AV while traveling from the point A to the point B along the trajectory or path.

15. The system of claim 14, wherein the plurality of instructions, when executed, further causes the one or more processors to perform processing comprising:
accessing weather and road condition data, the weather and road condition data indicating weather expected during the AV ride and road conditions along the route;
generating, using a third pre-trained risk model, a third risk value, wherein the third pre-trained risk model predicts the third risk value based on the weather and road condition data, and wherein the third risk value represents a likelihood, given the weather and road condition data, of occurrence of an incident during the AV ride; and
generating, using a third pre-trained pricing model, a third loss value, wherein the third pre-trained pricing model predicts the third loss value based on the weather and road condition data, and wherein the third loss value represents a loss associated with the weather and road condition data; and
wherein selecting the route for use during the AV ride is further based on the third risk value and the third loss value.

16. The system of claim 14, wherein selecting the route for use during the AV ride comprises (1) calculating an expected loss for the route based on the first risk value and the first loss value, and (2) calculating an expected loss for the AV based on the second risk value and the second loss value.

17. The system of claim 14, wherein the plurality of instructions, when executed, further causes the one or more processors to perform processing comprising:
calculating a complexity index based on attributes associated with the route, wherein the complexity index represents a degree of difficulty in navigating along the route, and wherein the first pre-trained risk model predicts the first risk value based on the complexity index.

18. The system of claim 14, wherein the first pre-trained risk model or the second pre-trained risk model was trained using simulation data generated during a computer simulation of the AV's operation.

19. A non-transitory computer-readable memory storing a plurality of instructions that, when executed by one or more processors of a computer system, causes the one or more processors to perform processing comprising:
receiving a request to provide an autonomous vehicle (AV) ride being booked by a user, wherein the request includes information identifying a start point and an end point for the AV ride, and information identifying an AV to be used for the ride;
determining a route from the start point to the end point;
accessing route data including attributes of the route;
accessing vehicle data including attributes of the AV, wherein at least some of the attributes included in the route data or the vehicle data are determined at a time associated with the AV ride;
generating, using a first pre-trained risk model, a first risk value for the route, wherein the first pre-trained risk model predicts the first risk value based on the route data, and wherein the first risk value represents a likelihood, given the route data, of occurrence of an incident during the AV ride, wherein an incident is an unsafe condition or disengagement of autonomous control,
wherein generating the first risk value includes calculating a pickup and drop-off complexity index (PDCI) for the route, the PDCI based on attributes associated with the start point and attributes associated with the end point, wherein the PDCI represents a degree of difficulty in navigating around the start point and the end point, wherein the first risk value is based at least in part on the PDCI;
generating, using a second pre-trained risk model, a second risk value for the AV, wherein the second pre-trained risk model predicts the second risk value based on the vehicle data, and wherein the second risk value represents a likelihood, given the vehicle data, of occurrence of an incident during the AV ride;
generating, using a first pre-trained pricing model, a first loss value for the route, wherein the first pre-trained pricing model predicts the first loss value based on the route data, and wherein the first loss value represents a loss associated with the route data;
generating, using a second pre-trained pricing model, a second loss value for the AV, wherein the second pre-trained pricing model predicts the second loss value based on the vehicle data, and wherein the second loss value represents a loss associated with the vehicle data;
selecting an actual route for use during the AV ride based at least in part on the first risk value, the first loss value, the second risk value, and the second loss value; and
communicating the selected actual route to a controller system of the AV;
obtaining, by the controller system, sensor data from a plurality of sensors, wherein the sensor data provides a representation of operation of the AV in an environment;
generating, by the controller system, an internal map based on the sensor data, wherein the internal map comprises a three-dimensional representation of the environment around the AV, information on a current state of the AV, and information about the environment
generating, by the controller system, a plan of action for the AV that identifies a trajectory or path to be traversed by the AV based on the selected actual route and the internal map, wherein the plan comprises one or more planned actions or operations to be performed by the AV to travel from point A to point B along the trajectory or path; and controlling, by the controller system, one or more vehicle systems of the AV to cause the planned actions or operations to be performed by the AV while traveling from the point A to the point B along the trajectory or path.

20. The method of claim 1 wherein operating the AV, including disengagement of autonomous control, is performed using a teleoperation system and a remote operator.

* * * * *